(12) United States Patent
Iwai

(10) Patent No.: US 7,845,088 B2
(45) Date of Patent: Dec. 7, 2010

(54) LENS SHAPE MEASURING METHOD AND LENS SHAPE MEASURING APPARATUS

(75) Inventor: Toshihiro Iwai, Itabashi-ku (JP)

(73) Assignee: Kabushiki Kaisha TOPCON, Itabashi-ku, Tokyo (JP)

( * ) Notice: Subject to any disclaimer, the term of this patent is extended or adjusted under 35 U.S.C. 154(b) by 0 days.

(21) Appl. No.: 12/569,248

(22) Filed: Sep. 29, 2009

(65) Prior Publication Data
US 2010/0077627 A1    Apr. 1, 2010

(30) Foreign Application Priority Data
Sep. 30, 2008   (JP)   ............... 2008-254306

(51) Int. Cl.
*G01B 5/20*   (2006.01)
(52) U.S. Cl. .................. 33/507; 33/200; 33/28
(58) Field of Classification Search .................. 33/200, 33/503, 507, 28
See application file for complete search history.

(56) References Cited

U.S. PATENT DOCUMENTS

| 5,465,495 | A | * | 11/1995 | Takubo ................. 33/507 |
| 5,501,017 | A | * | 3/1996 | Suzuki ................. 33/200 |
| 5,515,612 | A | * | 5/1996 | Igarashi et al. ........... 33/200 |
| 5,615,486 | A | * | 4/1997 | Igarashi et al. ........... 33/200 |
| 5,895,314 | A | * | 4/1999 | Kitao et al. ............. 451/43 |
| 5,959,199 | A | * | 9/1999 | Suzuki et al. ............ 33/507 |
| 5,984,763 | A | * | 11/1999 | Kitao et al. ............. 451/43 |
| 6,019,669 | A | * | 2/2000 | Kitao et al. ............. 451/43 |
| 6,163,967 | A |   | 12/2000 | Suzuki et al. |
| 6,263,583 | B1 | * | 7/2001 | Mizuno ................. 33/28 |
| 6,427,350 | B1 | * | 8/2002 | Asaoka et al. ............ 33/507 |
| 6,473,977 | B1 | * | 11/2002 | Kujawa ................. 33/28 |
| 6,530,156 | B1 | * | 3/2003 | Matsuyama .............. 33/507 |
| 6,625,893 | B2 | * | 9/2003 | Suzuki et al. ............ 33/200 |
| 6,742,272 | B2 | * | 6/2004 | Eto et al. ............... 33/507 |
| 6,845,678 | B2 | * | 1/2005 | Igarashi et al. ........... 33/28 |
| 6,945,848 | B1 | * | 9/2005 | Watanabe et al. .......... 451/8 |
| 6,964,104 | B2 | * | 11/2005 | Suzuki et al. ............ 33/200 |
| 7,500,315 | B2 | * | 3/2009 | Takeichi ................ 33/28 |

(Continued)

FOREIGN PATENT DOCUMENTS

JP    7-164295 A   6/1995

(Continued)

*Primary Examiner*—Yaritza Guadalupe-McCall
(74) *Attorney, Agent, or Firm*—Buchanan Ingersoll & Rooney PC

(57) ABSTRACT

A lens shape measuring method includes: bringing a feeler into contact with an outer peripheral surface of a spectacle lens, the outer peripheral surface corresponding to a lens shape of spectacles, the feeler being rotatable about a rotation axis and movable forward and backward relative to the rotation axis in a radial direction, and, while keeping the contact state, moving the feeler along a contact surface of the feeler with the lens shape in a circumferential direction, to measure radii $\rho i$ (i=0, 1, 2, ... n) of the lens shape over an entire circumference of thereof, the radii $\rho i$ representing change in distance from a geometric center of the lens shape to the feeler, a measurement region of the lens shape being divided into multiple sub-regions, and within each of the sub-regions, the rotation axis line being moved to a position to cause the feeler to measure the lens shape within the sub-region.

8 Claims, 37 Drawing Sheets

U.S. PATENT DOCUMENTS

| | | | |
|---|---|---|---|
| 7,500,316 B2 * | 3/2009 | Haddadi | 33/200 |
| 7,571,545 B2 * | 8/2009 | Nauche et al. | 33/200 |
| 7,631,431 B2 * | 12/2009 | Matsuyama | 33/28 |
| 7,721,452 B2 * | 5/2010 | Koyama | 33/200 |
| 2002/0026722 A1 * | 3/2002 | Suzuki et al. | 33/200 |
| 2002/0104226 A1 * | 8/2002 | Eto et al. | 33/507 |
| 2002/0166247 A1 * | 11/2002 | Andrews et al. | 33/200 |
| 2003/0182813 A1 * | 10/2003 | Suzuki et al. | 33/200 |
| 2005/0251280 A1 * | 11/2005 | Shibata | 33/200 |
| 2009/0064512 A1 * | 3/2009 | Matsuyama | 33/28 |
| 2009/0241356 A1 * | 10/2009 | Koyama | 33/200 |
| 2010/0064533 A1 * | 3/2010 | Miyashita | 33/200 |

FOREIGN PATENT DOCUMENTS

| | | |
|---|---|---|
| JP | 8-294855 A | 11/1996 |
| JP | 10-328992 A | 12/1998 |

* cited by examiner

Z DIRECTION DIFFERENCE-CURVE VALUE RELATIONSHIP $y = 3.3695 \Delta L + 0.0809$

LENS SHAPE MEASURING METHOD AND LENS SHAPE MEASURING APPARATUS

CROSS-REFERENCE TO THE RELATED APPLICATION

The present application is based on and claims priority from Japanese Application Number 2008-254306, filed on Sep. 30, 2008, the disclosure of which is hereby incorporated by reference herein in its entirety.

BACKGROUND OF THE INVENTION

1. Field of the Invention

The present invention relates to a lens shape measuring method and a lens shape measuring apparatus for measuring, in terms of lens shape: a lens frame shape of a spectacle frame; and an outer diameter shape of a template, a dummy lens, or the like.

2. Description of the Related Art

Conventionally there has been a kind of lens shape measuring apparatus for measuring a lens shape for a lens frame and the shape of a spectacle lens. The lens shape measuring apparatus of this kind includes: a lens frame feeler for measuring the inner peripheral surface shape (lens fitting groove (V-shaped groove) shape) of a lens frame of a spectacle frame; and a lens shape feeler for measuring the outer peripheral surface shape of a lens shape of a template, a dummy lens or the like (for example, refer to Japanese Unexamined Patent Application Publication No. H7-164295).

This conventional lens shape measuring apparatus includes: a rotation base mounted rotatably about a vertical rotation axis line; a slider mounted on the rotation base movably forward and backward in a radial direction of rotation about the rotation axis line; the lens frame feeler vertically movably held by the slider, and the lens shape feeler tiltably mounted on the slider.

With this conventional lens shape measuring apparatus, the measurement is performed as follows. Specifically, while the rotation base is horizontally rotated about the rotation axis line, the lens frame feeler is moved along a lens fitting groove of a lens frame or the like in the circumferential direction or the lens shape feeler is moved along the outer peripheral surface of a lens in the circumferential direction. During the movement, the amount of movement of the feeler in the horizontal direction (in the radial direction of the rotation about the rotation axis line) is measured with respect to the rotation angle θi of the rotation base about the rotation axis line. Thus, change in distance from the geometric center of the lens shape to the feeler is measured as radii ρi.

In a measurement using such a conventional lens shape measuring apparatus, just before left and right spectacle lens frames are held by a frame holding section and the shape thereof is measured, the feeler mounted on the slider is arranged at a position corresponding to a geometric center of a left or right lens frame of spectacles having average-sized lens frames and having a distance between geometric centers of the left and right lens frames (frame pupil distance: FPD) in an average range. Then, this feeler is brought into contact with a measurement starting position of a lower rim part of the lens frame. Note that the maximum moving amount of this feeler in the horizontal direction (in the radial direction of the rotation about the rotation axis line) from the position immediately before the start of a measurement is predetermined.

While the rotation base is rotated horizontally about a vertical axis, amounts of horizontal movement of the feeler from the contact position of the feeler with the lower rim part with respect to rotation angles θi about the vertical axis of the rotation base are measured as radii ρi, so that lens shape data (θi, ρi) for the lens frame is obtained.

The larger the sizes of lens frame shapes (lens shapes) of left and right lens frames, the longer the distance FPD between the geometric centers of the left and right spectacle lens frames. For this reason, there has been a problem that, the larger the lens frames relative to those of average-sized spectacles, the larger the discrepancy between the setting position of the feeler immediately before the start of the measurement and the position of the geometric center of one of the lens frames.

Further, the conventional lens shape measuring apparatus as described above has the following problem because the maximum moving amount of the feeler in the horizontal direction (in the radial direction of the rotation about the rotation axis line) is predetermined. Specifically, in a lens frame shape measurement on a lens frame of large spectacles whose distance between the geometric centers of the left and right lens frames, i.e., FPD, is long, if the measurement is started at a measurement start position which is set for measurement on spectacles having average-sized lens frames, the feeler may get out of contact with the lens fitting groove in some cases. Likewise, in a measurement on a template for lens frames of large spectacles whose distance between the geometric centers of the left and right lens frames, i.e., FPD, is long, if the measurement is started at the measurement start position, the feeler stops and no further measurement on the template is possible because of the predetermined maximum moving amount of the feeler in the horizontal direction.

A larger maximum moving amount of the feeler in the horizontal direction (in the radial direction of the rotation about the rotation axis line) can prevent such problems. In such a case, however, a measurement unit of the lens shape measuring apparatus is larger in size, and consequently the lens shape measuring apparatus as a whole is larger in size.

SUMMARY OF THE INVENTION

In this connection, an object of the present invention is to provide a lens shape measuring method and a lens shape measuring apparatus capable of measuring a large lens shape without enlargement in size of the apparatus as a whole.

To achieve this object, a lens shape measuring method according to one embodiment of the present invention includes the steps of bringing a feeler into contact with any one of an inner peripheral surface of a lens frame and an outer peripheral surface of a spectacle lens or a template, each of the inner peripheral surface and the outer peripheral surface corresponding to a lens shape of spectacles, the feeler being rotatable about a rotation axis and movable forward and backward relative to the rotation axis in a radial direction, and while keeping the contact state, moving the feeler along a contact surface of the feeler with the lens shape in a circumferential direction, to thereby measure radii ρi (i=0, 1, 2, ... n) of the lens shape over an entire circumference of the lens shape, the radii ρi representing change in distance from a geometric center of the lens shape to the feeler. Moreover, a measurement region of the lens shape is divided into multiple sub-regions, and within each of the sub-regions, the rotation axis line (the rotation center O5) is moved to a position with which the feeler (a lens shape prove 36 or a lens frame prove 37) is capable of measuring the lens shape to thereby cause the feeler to measure the lens shape within the sub-region.

DETAILED DESCRIPTION OF THE PREFERRED EMBODIMENTS

Hereinafter, a description is given of embodiments of the present invention based on the drawings.

[Configuration]

Figure 1A:
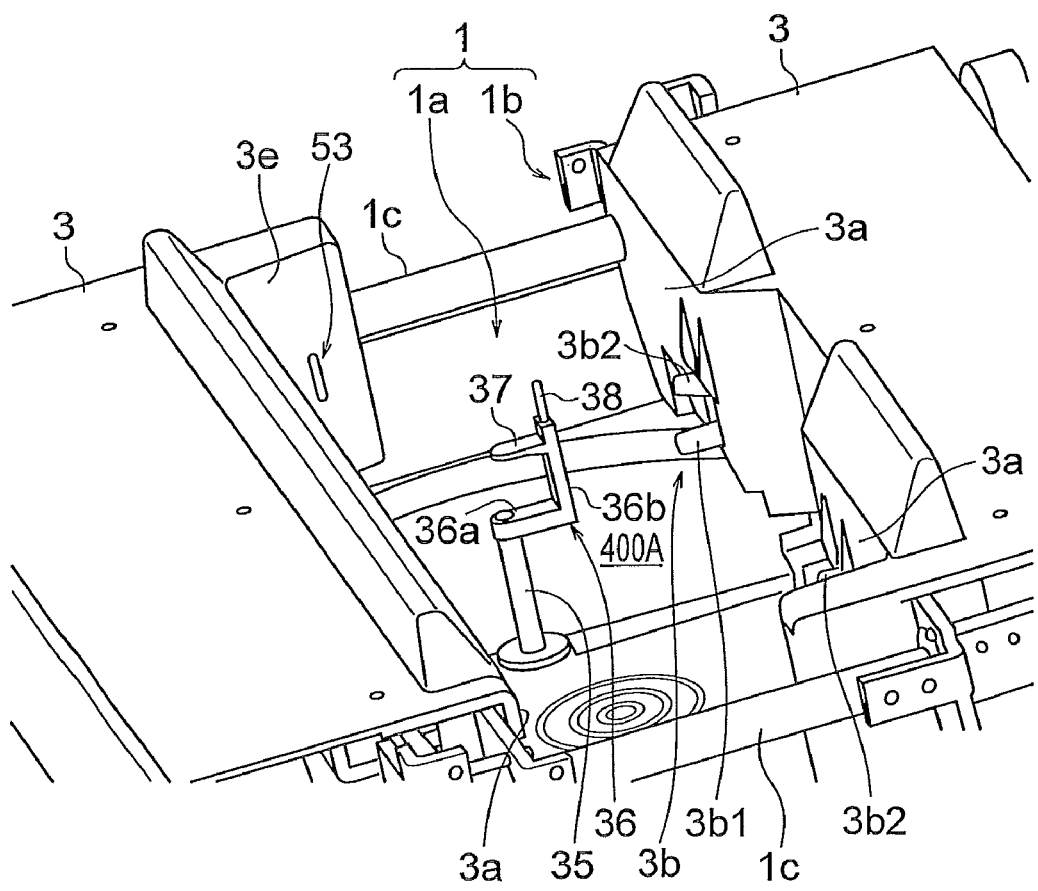
FIG. 1A is a partial schematic perspective view of a lens shape measuring apparatus according to the present invention.
Figure 1B:
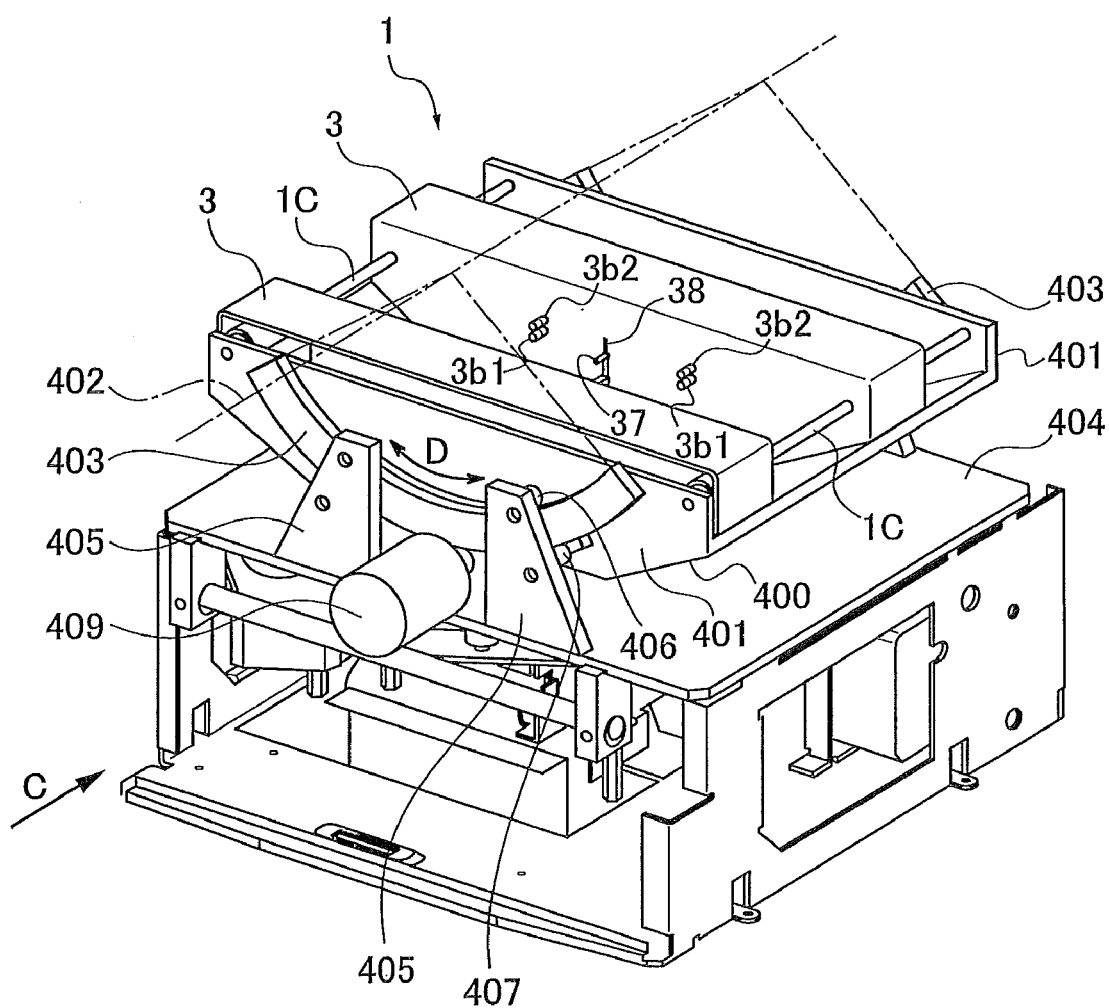
FIG. 1B is a perspective view of the lens shape measuring apparatus according to the present invention.
Figure 1C:
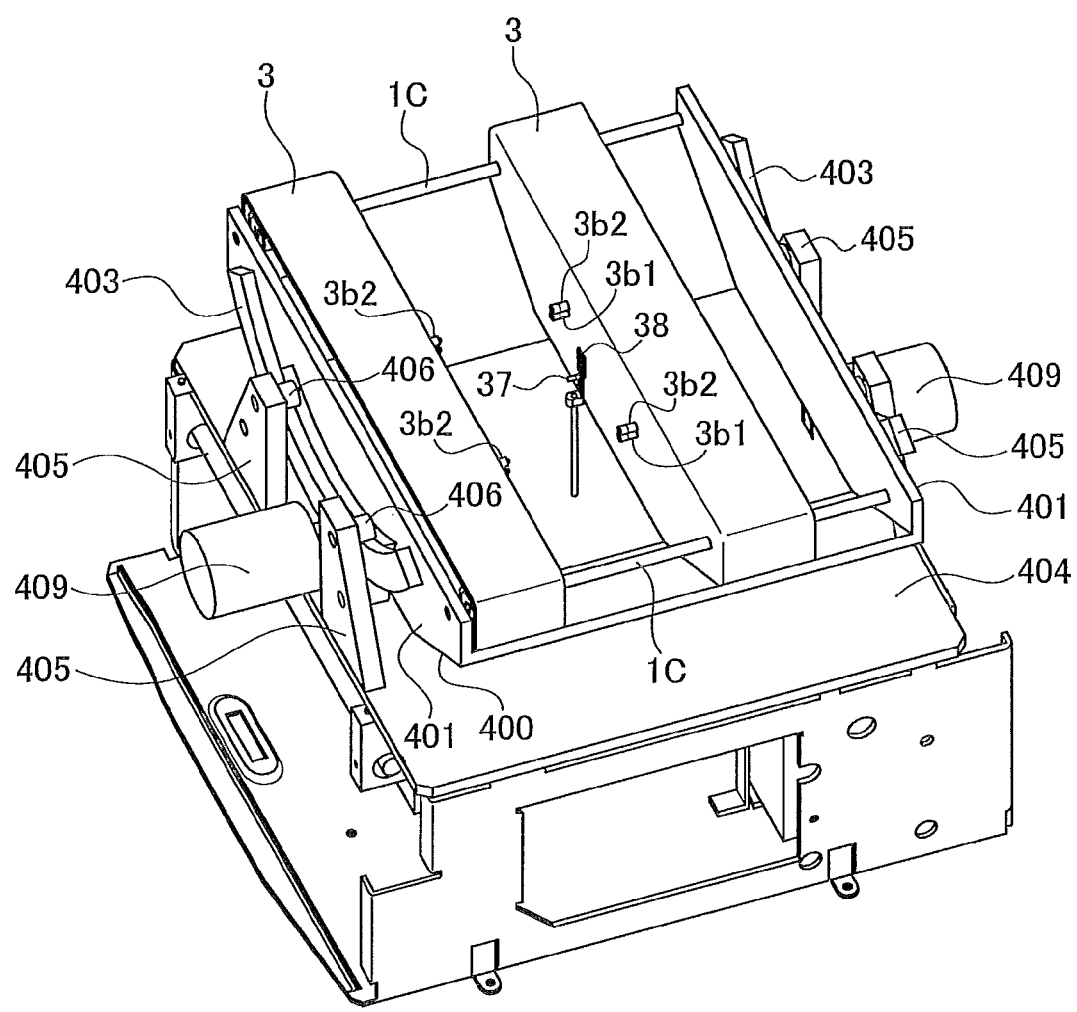
FIG. 1C is a perspective view of the lens shape measuring apparatus of FIG. 1B from another viewpoint.
Figure 2:
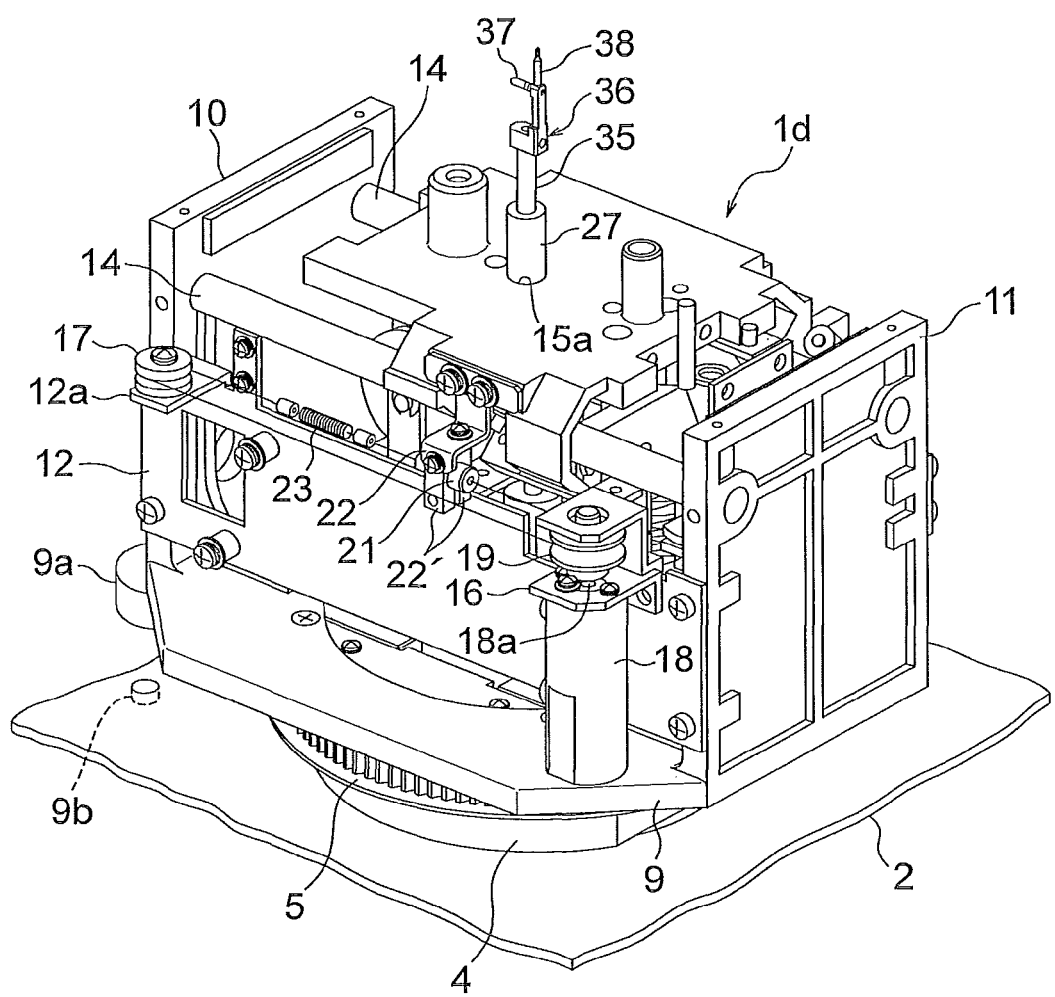
FIG. 2 is a perspective view of a measuring mechanism of the lens shape measuring apparatus of FIG. 1.

FIG. 1A shows a configuration of a main portion of a lens shape measuring apparatus according to the present invention (also serving as a spectacle lens frame shape measuring apparatus), which includes a measuring apparatus body 1. The measuring apparatus body 1 includes: a case section 1a for accommodating a measuring mechanism located in lower part; and a lens frame holding mechanism 1b provided above the case section 1a. In the bottom of the case section 1a of FIG. 1A, a base 2 shown in FIG. 2 is provided.

The lens frame holding mechanism 1b includes a pair of parallel guide rods (guide members) 1c and 1c which are fixed to the case section 1a. On the guide members 1c and 1c, slide frames 3 and 3 are held so as to approach and separate from each other.

The slide frames 3 and 3 are biased by a not-shown coil spring or the like so as to approach to each other. Each of the slide frames 3 and 3 includes: a vertical wall 3a which faces a vertical wall 3a of the other slide frame 3 and is caused to abut on spectacle lens frames (not shown); and lens frame holders (holding device) 3b holding the spectacle lens frames.

Each of the lens frame holders 3b includes a lower holding bar 3b1 (holding pin) protruding from the vertical wall 3a and an upper holding bar 3b2 (holding pin) attached to the slide frame 3 so as to open and close from above the holding bar 3b1. The lens frame holders 3b are provided to right and left lens frames of not-shown spectacles, respectively.

Such lens frame holding mechanisms 1b can employ a configuration disclosed in, for example, Japanese Patent Application Publication No. H10-328992 or the like or can employ other known techniques.

<Measurement Mechanism>

As shown in FIGS. 1A and 1B to 1D, the slide frame 3 includes a bottom surface 400 formed in a rectangle protruding downward. At the center of the bottom surface 400, an opening 400A is formed. The opening 400A is configured to allow a lens frame feeler or probe 37 and an attachment hole feeler 38 to be inserted therethrough upward from the bottom side. The lens frame feeler 37 and attachment hole feeler 38 are described later.

The bottom surface 400 may be a cylindrical surface protruding downward. Moreover, to an outer surface 401 of the slide frame 3, a guiderail 403 having a belt-like shape curved in an arc around a virtual axis 402 is attached.

Meanwhile, the measuring apparatus body 1 includes brackets 405 and 405 standing up on each upper end of a lower case 404. Each of the brackets 405 and 405 is provided with a rotatable supporting skid 406 in upper part and a rotatable supporting skid 407 below the supporting skid 406. The supporting skids 406 and 407 of each bracket 405 are arranged so as to sandwich the guiderail 403 of the slide frame 3 at upper and lower positions.

The both slide frames 3 are supported on the lower case 404 of the measuring apparatus body 1 through the guiderails 403 sandwiched by the supporting skids 406 and 407 at the upper and lower portions. The both slide frames 3 can therefore swing in a direction of an arrow D around the virtual axis 402.

Figure 1D:
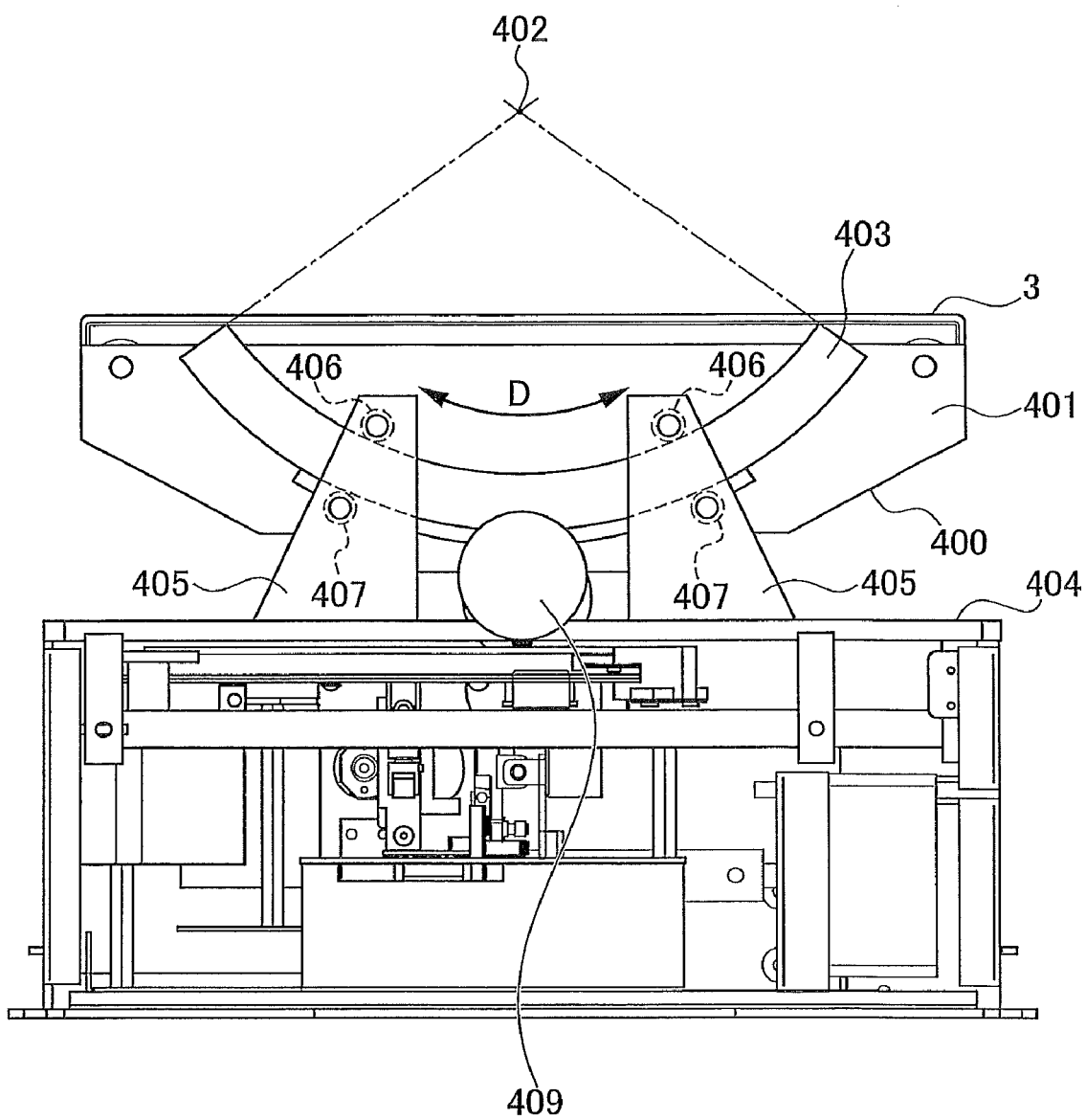
FIG. 1D is a side view of the lens shape measuring apparatus of FIG. 1B in a direction of an arrow C.
Figure 1E:
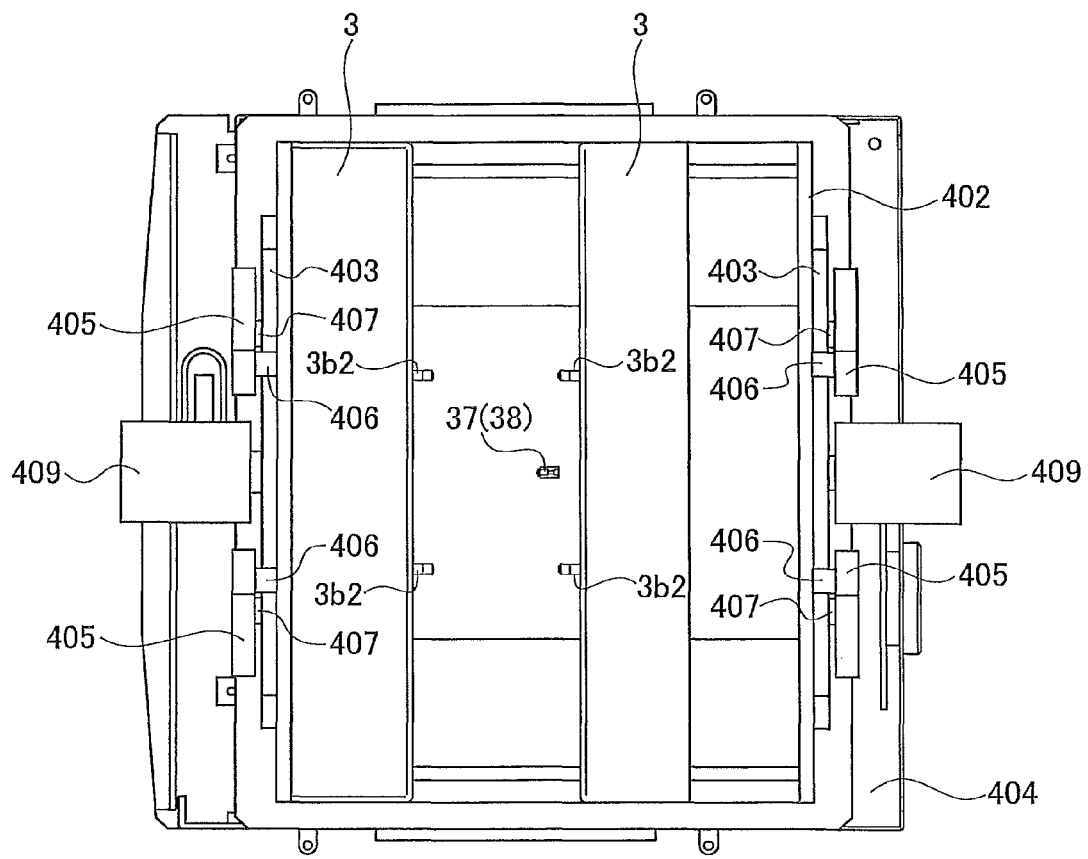
FIG. 1E is a top view of the lens shape measuring apparatus of FIG. 1B.
Figure 1F:
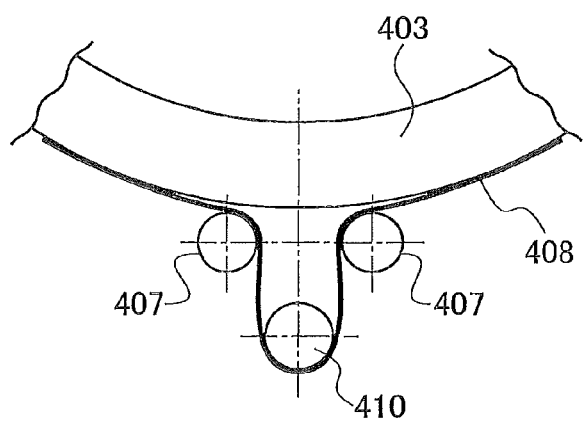
FIG. 1F is a view showing a mechanism swinging a frame holding section.

As shown in FIG. 1F, on a lower edge of each guiderail 403, a belt 408 is provided. Both ends of the belt 408 are fixed to the lower edge of the guiderail 403, and the other part thereof is not fixed to the lower edge of the guiderail 403. In other words, the part of the belt 408 other than the both ends can be separated from the lower edge of the guiderail 403.

On the lower case 404 of the measuring apparatus body 1, motors 409 (see FIGS. 1B to 1E) as a driving section are provided. On an output shaft of each motor 409, a driving skid 410 is attached. The driving skid 410 is placed substantially in the middle between the supporting skids 407 and 407 respectively attached to the brackets 405 and 405 on both sides thereof and below the supporting skids 407 and 407.

The belt 408 provided on the lower edge of the guiderail 403 is wound around one of the supporting skids 407 and 407, wound around the driving skid 410, and then wound around the other supporting skid 407. The upper surface of the belt 408 (the surface brought into contact with the lower edge of the guiderail 403) is jagged, and the outer circumferential surface of the driving skid 410 is also jagged.

This results in providing a large coefficient of friction between the upper surface of the belt 408 and the outer circumferential surface of the driving skid 410. Accordingly, when the driving skid 410 rotates, the belt 408 moves to the right or left in FIG. 1F without slipping. The slide frame 3 can be therefore swung in the direction of the arrow D around the virtual axis 402 (see FIGS. 1B and 1D).

The guiderails 403, supporting skids 406 and 407, belts 408, motors 409, and driving skids 410 constitute a holding unit swinging mechanism.

On the base 2, a measurement mechanism 1d as shown in FIGS. 2 to 5A is provided. The measurement mechanism 1d includes a base supporting member 4 fixed on the base 2. To the base supporting member 4, a large-diameter driven gear 5 is attached so as to horizontally rotate around a vertical axis.

Figure 5A:
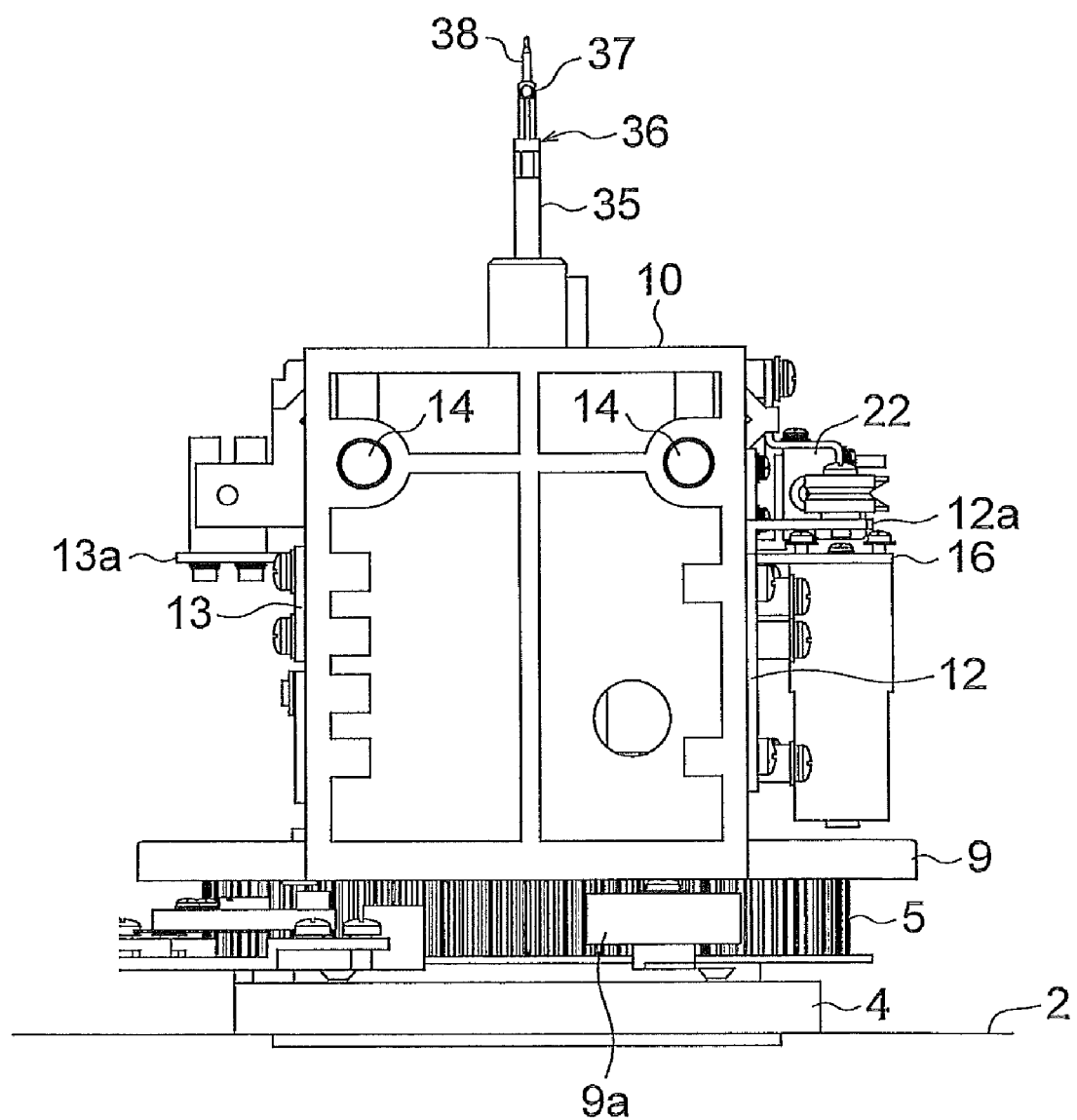
FIG. 5A is a right side view of the measuring mechanism of FIG. 4.
Figure 5B:
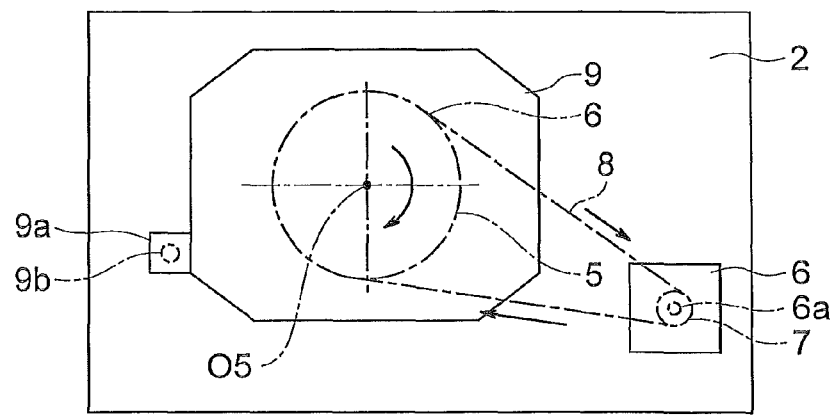
FIG. 5B is a schematic view showing a driving unit for a rotation base of the measuring mechanism of FIG. 2.

To the base 2, a driving motor 6 schematically shown in FIG. 5B is attached adjacent to the driven gear (timing gear) 5. On an output shaft 6a of the driving motor 6, a pinion (timing gear) 7 is fixed. A timing belt 8 is wound around the pinion 7 and driven gear 5.

When the driving motor 6 is activated, rotation of the output shaft 6a of the driving motor 6 is transmitted through the pinion 7 and timing belt 8 to the driven gear 5, and thereby rotates the driven gear 5. Here, the driving motor 6 is a two-phase stepping motor.

As shown in FIGS. 2 to 5A, a rotation base 9 is integrally fixed on the driven gear 5.

To the rotation base 9, a photosensor 9a as an origin detecting device (origin detector) is attached.

In this case, for example, a light emitter 9b for indicating an origin is provided on the base 2, and a linear or spot light beam is emitted from the light emitter 9b upward as an origin mark. The position of origin of horizontal rotation of the rotation base 9 can be set to the position where the photosensor 9a detects the light beam as the origin mark.

The origin detecting device can employ a known technique such as a transmissive photosensor, a reflective photosensor, or a proximity sensor.

Figure 3:
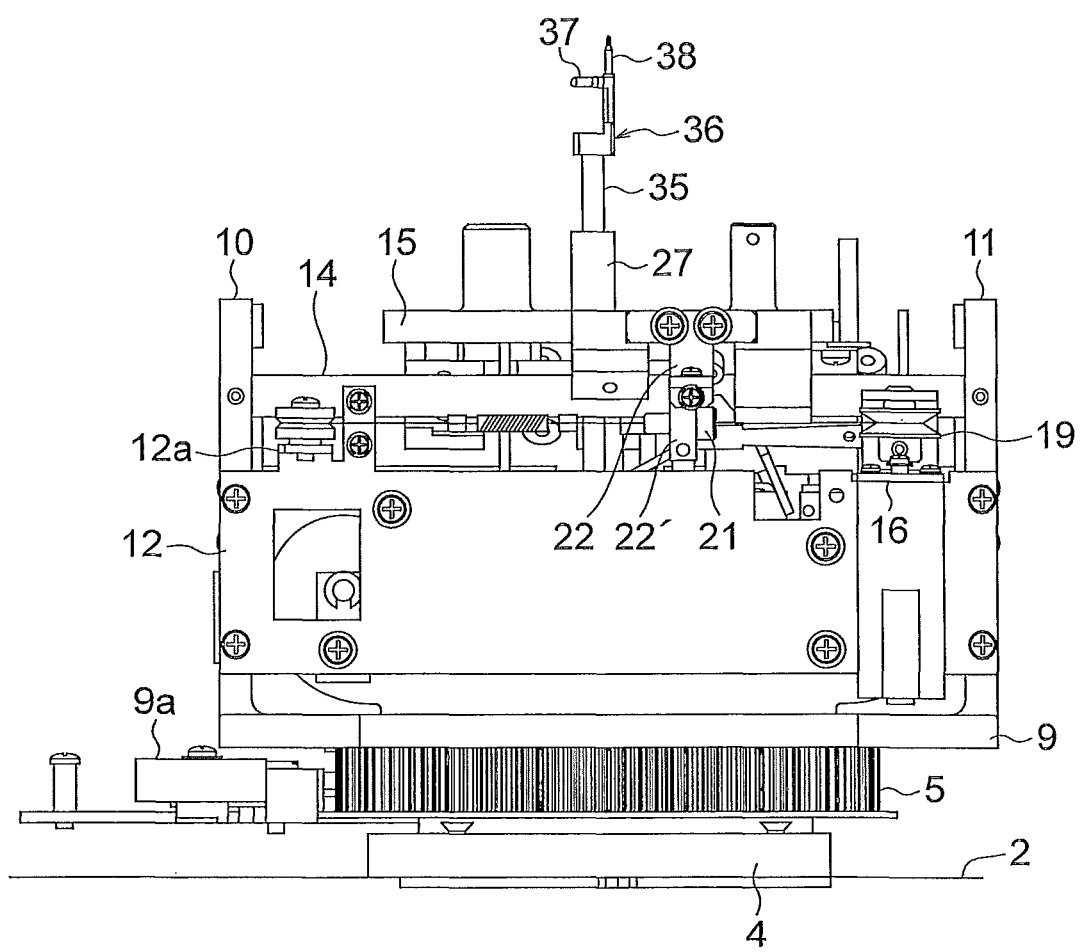
FIG. 3 is a front view of the measuring mechanism of FIG. 2.
Figure 4:
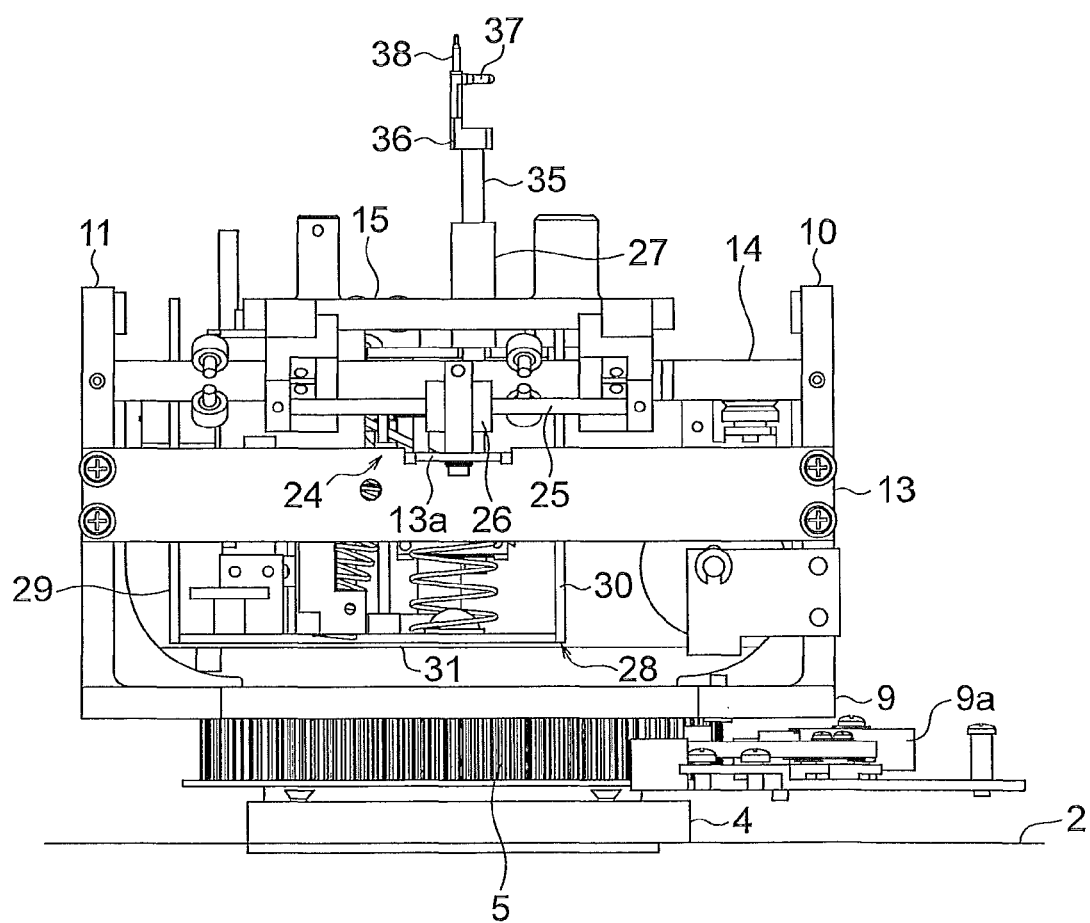
FIG. 4 is a back view of the measuring mechanism of FIG. 2.

Furthermore, to both ends of the rotation base 9 in the longitudinal direction, as shown in FIGS. 2 to 4, rail attachment plates 10 and 11, which vertically extend and face each other in parallel, are integrally fixed. As shown in FIG. 3, to an end of the rail attachment plate 10 and an end of the rail attachment plate 1 11, longitudinal ends of a side plate 12 are respectively fixed. As shown in FIG. 4, to the other end of the rail attachment plate 10 and the other end of the rail attachment plate 1 11, longitudinal ends of a side plate 13 are respectively fixed.

As shown in FIGS. 2 to 4, a pair of shaft-shaped guide rails 14 and 14 parallel to each other is horizontally provided between upper halves of the rail attachment plates 10 and 11 facing each other. The both ends of each guiderail 14 are fixed to the rail attachment plates 10 and 11, and a slider 15 is held on the guiderails 14 and 14 so as to advance and retract in the longitudinal direction.

As shown in FIGS. 2 and 3, a pulley supporting plate section 12a horizontally protruding laterally is formed by bending integrally with the side plate 12 in the vicinity of the rail attachment plate 10. Moreover, a bracket 16 for motor attachment is fixed to the side plate 12 in the vicinity of the rail supporting plate 11.

To the pulley supporting plate section 12a, a driven pulley 17 is attached so as to horizontally rotate around an axis vertically extending, and the upper end of a driving motor 18 for moving a slider is fixed to the bracket 16. Here, the driving motor 18 is a DC motor.

Figure 5C:
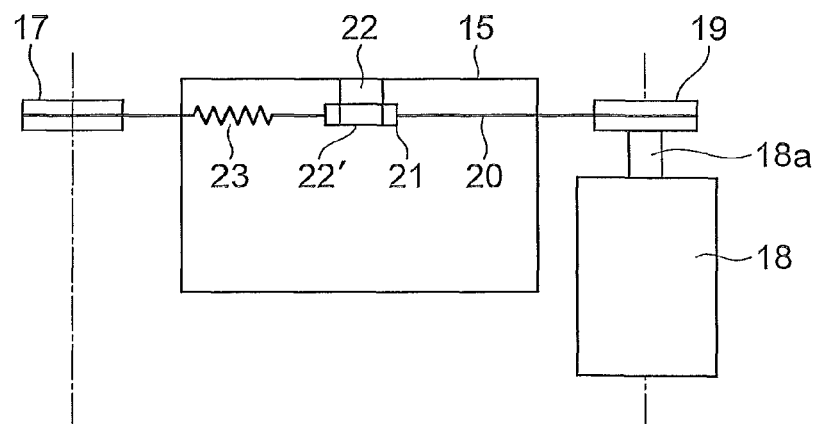
FIG. 5C is a schematic view for explaining a slider driving mechanism of FIG. 2.
Figure 5D:
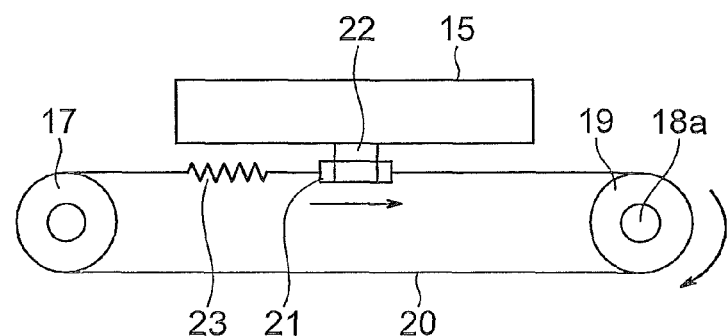
FIG. 5D is a plan view of FIG. 5C.

An output shaft 18a of the driving motor 18 includes an axis line vertically extending and is attached to a driving pulley 19 as shown in FIGS. 5C and 5D.

A ring-shaped wire 20 is wound around the pulleys 17 and 19, and a portion of the wire 20 in the vicinity of an end thereof is held by a shaft-shaped wire holding member 21. This wire holding member 21 is fixed to the slider 15 through brackets 22 and 22'.

The both ends of the wire 20 are connected through a coil spring 23. When the driving motor 18 is operated forward or backward, the output shaft 18a and driving pulley 19 are rotated forward or backward, and the slider 15 is thus moved to the right or left in FIG. 3.

Figure 5E:
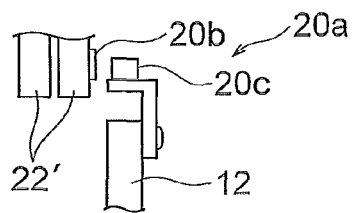
FIG. 5E is a schematic explanatory view of a slider origin detector of FIG. 2.

As shown in FIG. 5E, an origin sensor (an origin detector) 20a detecting the origin of movement position of the slider 15 (an amount of movement) is provided between the bracket 22' and side plate 12. Here, the origin sensor 20a is a reflection-type sensor. This sensor includes a reflector 20b provided with a slit-shaped reflecting surface vertically extending (not shown) and a reflective photosensor 20c including light emitting and receiving elements.

The reflector 20b is provided for the bracket 22', and the photosensor 20c is provided for the side plate 12.

The origin sensor 20a can employ a known technique including a transmissive photosensor, a proximity sensor, or the like.

At the longitudinal center of the side plate 13 of FIG. 4, a supporting plate section 13a horizontally protruding laterally is formed by bending integrally with the side plate 13 as shown in FIG. 4. Between the side plate 13 and slider 15, as shown in FIG. 4, a linear scale (a position measuring unit) 24 detecting the horizontal movement position of the slider 15 in the direction that the guiderails 14 and 14 extend is provided as a radius detection sensor (a radius detector).

The linear scale 24 is provided with: a shaft-shaped main scale 25 held by the slider 15 in parallel to the guiderails 14 and 14; and a detection head 26 fixed to the supporting plate section 13a and reads position information of the main scale 25.

The detection head 26 is configured to detect the horizontal movement position of the slider 15 from position detection information (movement amount detection information) provided by the main scale 25. Here, the linear scale 24 can be, for example, of a known magnetic or optical type.

For example, in the case of a magnetic type, magnetic patterns of magnetic polarities S and N are alternately provided on the main scale 25 at minute intervals in the axial direction as the position detection information (movement amount detection information). These magnetic patterns are detected by the detection head (magnetic change detection head) 26 to detect the amount of movement (movement position) of the slider 15.

In the case of an optical type, the main scale 25 is formed into a plate, and slits are provided in the main scale 25 at minute intervals in the longitudinal direction thereof. Moreover, light emitting and receiving elements are provided so as to sandwich the main scale 25. Light from the light emitting element is detected by the light receiving element through the slits of the main scale 25 to obtain the number of slits, thus detecting the amount of movement (movement position) of the slider 15.

Substantially at the center of the slider 15, a through-hole 15a is formed as shown in FIG. 2. Through the through-hole 15a, a guide cylinder 27 vertically extending is inserted. Under the slider 15, a supporting frame 28 is provided as shown in FIG. 4.

The supporting frame 28 includes: vertical frames 29 and 30 whose upper ends are held by the slider 15; and a horizontal plate (a bottom plate) 31 fixed to the lower ends of the vertical frames 29 and 30.

Figure 8:
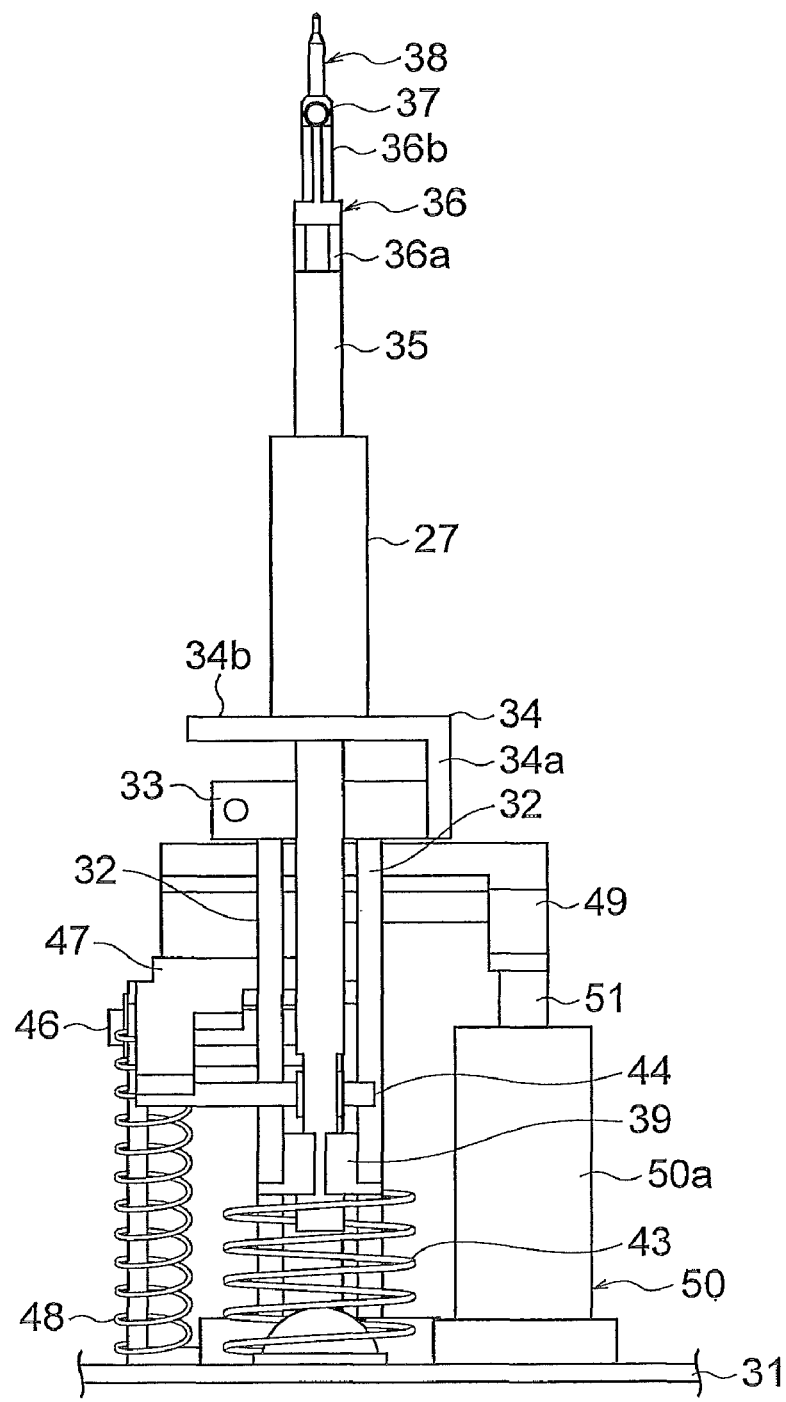
FIG. 8 is a left side view of FIG. 7.

To the horizontal plate (bottom plate) 31, lower ends of a pair of shaft-shaped supporting members 32 and 32, which vertically extend in parallel to each other, are fixed (see FIG. 8). To upper ends of the supporting members 32 and 32, a holding member (a coupling member) 33 is fixed. To the holding member 33, a vertical wall 34a of a guide supporting member 34 is fixed, the guide supporting member 34 having an L-shaped side surface. On a horizontal wall (an upper wall) 34b of the guide supporting member 34, a lower end of the guide cylinder 27 is fixed.

A feeler shaft 35 vertically extending is fitted to and held by the guide cylinder 27 so as to vertically move. At an upper end of the feeler shaft 35, a lens shape feeler (a lens rim shape feeler) 36 is integrally provided. The lens shape feeler 36 includes: an attachment section 36a vertically attached to the upper end of the feeler shaft 35; and a vertical section 36b extending upward from the attachment section 36a. The attachment section 36a and vertical section 36b form an L shape.

A back surface 36c of the vertical section 36 is processed at a constant R (see FIG. 10A) for lens rim shape measurement. At the upper end of the vertical section 36b, the lens frame feeler 37 (a feeler) is integrally formed in parallel to the attachment section 36a.

Note that, herein, the feeler represents any of the lens shape feeler 36, the lens frame feeler 37 and the attachment hole feeler 38.

The horizontal movement of the slider 15 guided by the guide rail 14 causes this feeler shaft 35 and these feelers 36 and 37 to move forward or backward in the radial direction relative to a rotational center (rotation axis line) O5 shown in FIG. 5B, which is the rotation axes line of the driven gear 5 and the rotation base 9. Note that the amount of the forward and backward movement of the feeler shaft 35 and the feelers 36 and 37 in the radial direction varies depending on the length of the guide rail 14, the size of the slider 15, and the like. The maximum moving amounts of the feeler shaft 35, the feelers 36 and 37 in the radial direction are predetermined.

Figure 10A:
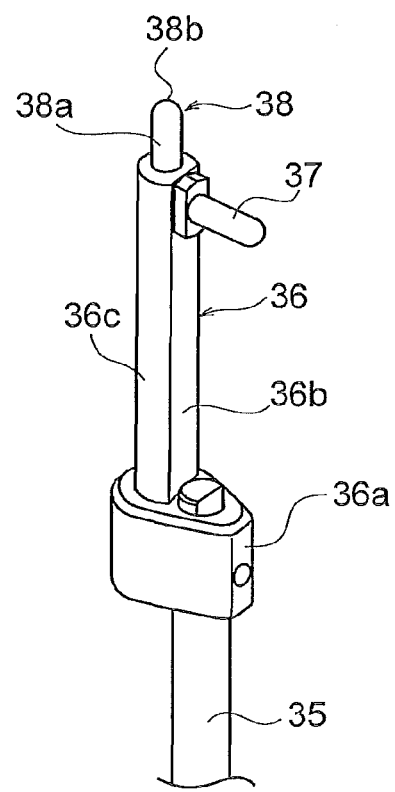
FIG. 10A is a side view of FIG. 9.

Moreover, at the upper end of the lens shape feeler 36, as shown in FIG. 10A, the attachment hole feeler 38 protruding upward is integrally provided. The attachment hole feeler 38 includes: a shaft 38a which is integrally attached to the upper end of the vertical section 36b of the lens shape feeler 36 in parallel to the axis line of the feeler shaft 35; and a hemisphere 38b provided at the upper end of the shaft 38a. For coping with attachment holes with a wide variety of sizes, it is desirable that the hemisphere 38b have a hemispherical shape larger in diameter than a general attachment hole (2.2φ).

Figure 9:
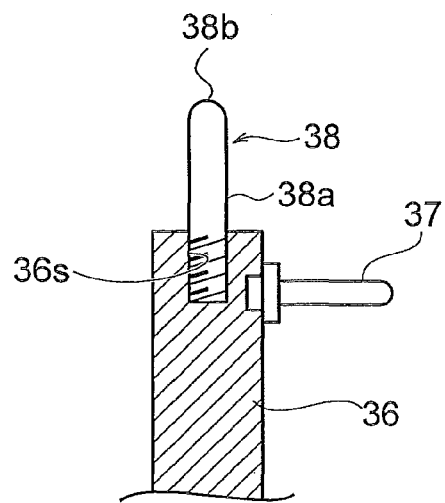
FIG. 9 is a partial enlarged perspective view of the lens shape feeler shown in FIG. 1.

The attachment hole feeler 38 is not necessarily integrated with the lens-shape feeler 36 unlike described above. For example, as shown in FIG. 9, the lens-shape feeler 36 may be detachably attached to the upper end of the vertical section 36b of the lens shape feeler 36 by providing a thread 36s for the lens shape feeler 36 as shown in FIG. 9 and screwing the thread 36s to the upper end of the vertical section 36b.

Figure 6:
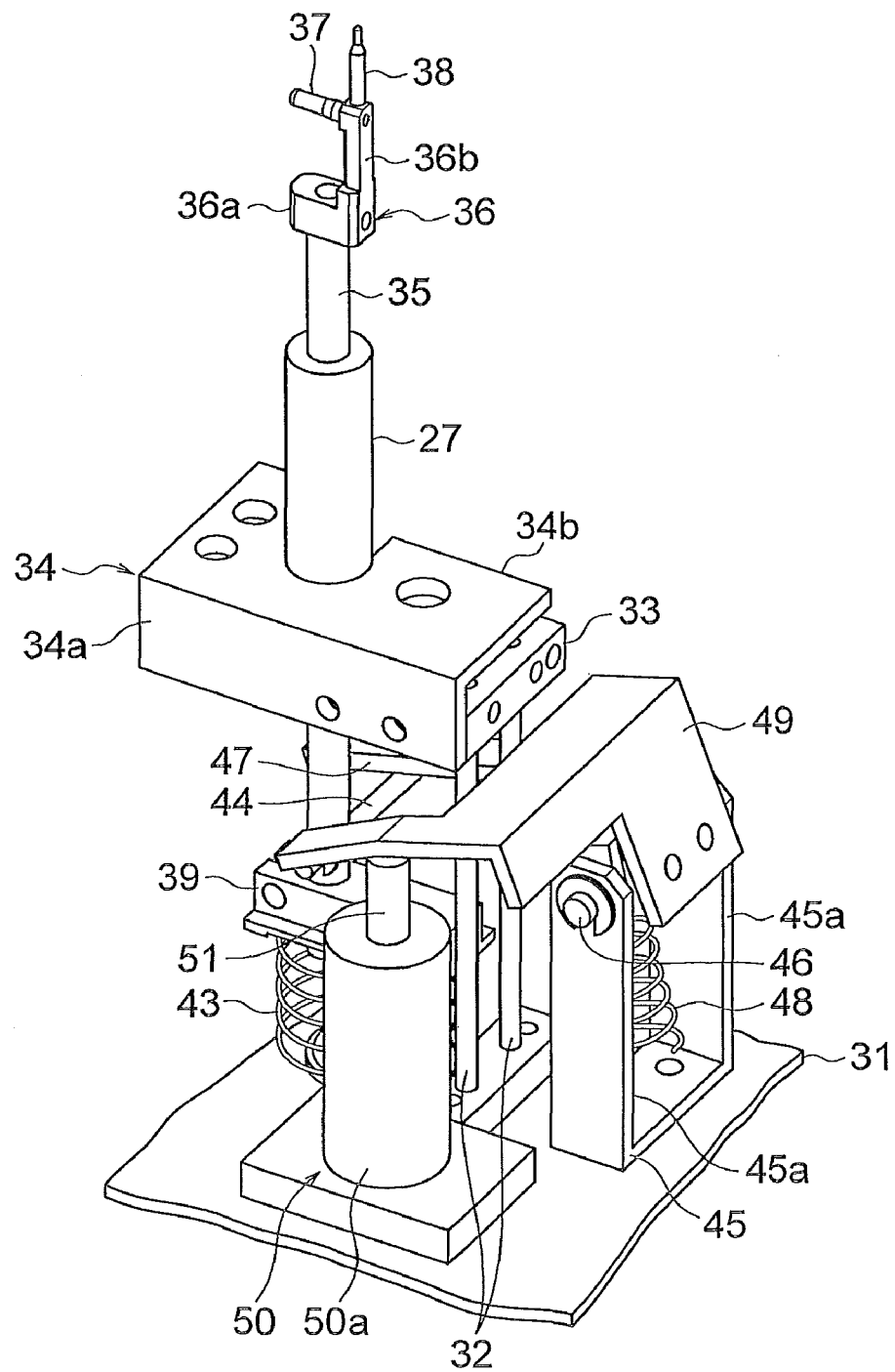
FIG. 6 is a perspective view showing a feeler elevating mechanism of FIG. 2.
Figure 7:
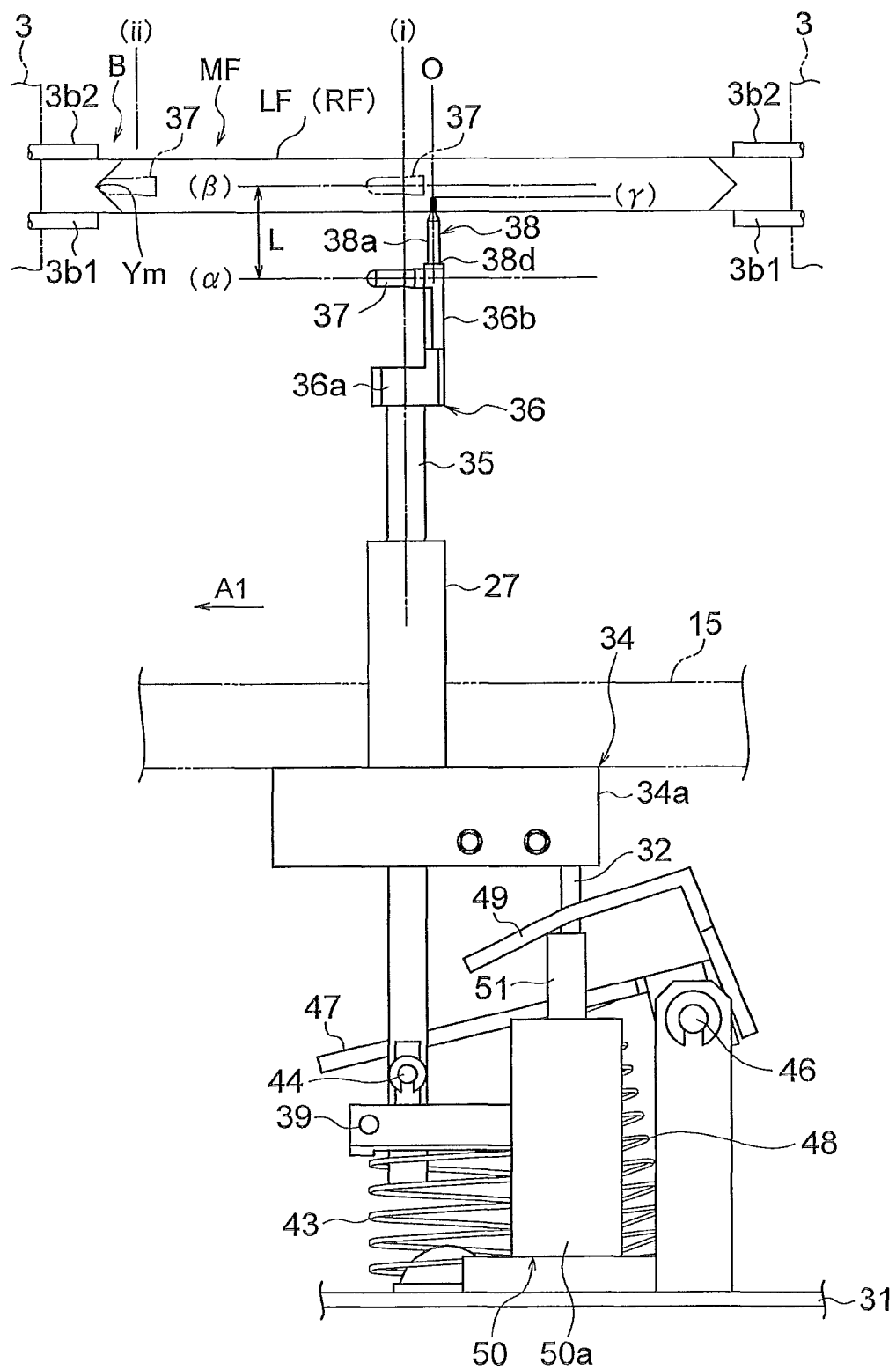
FIG. 7 is an explanatory view for measurement of a lens frame by the feeler elevating mechanism of FIG. 6.
Figure 13:
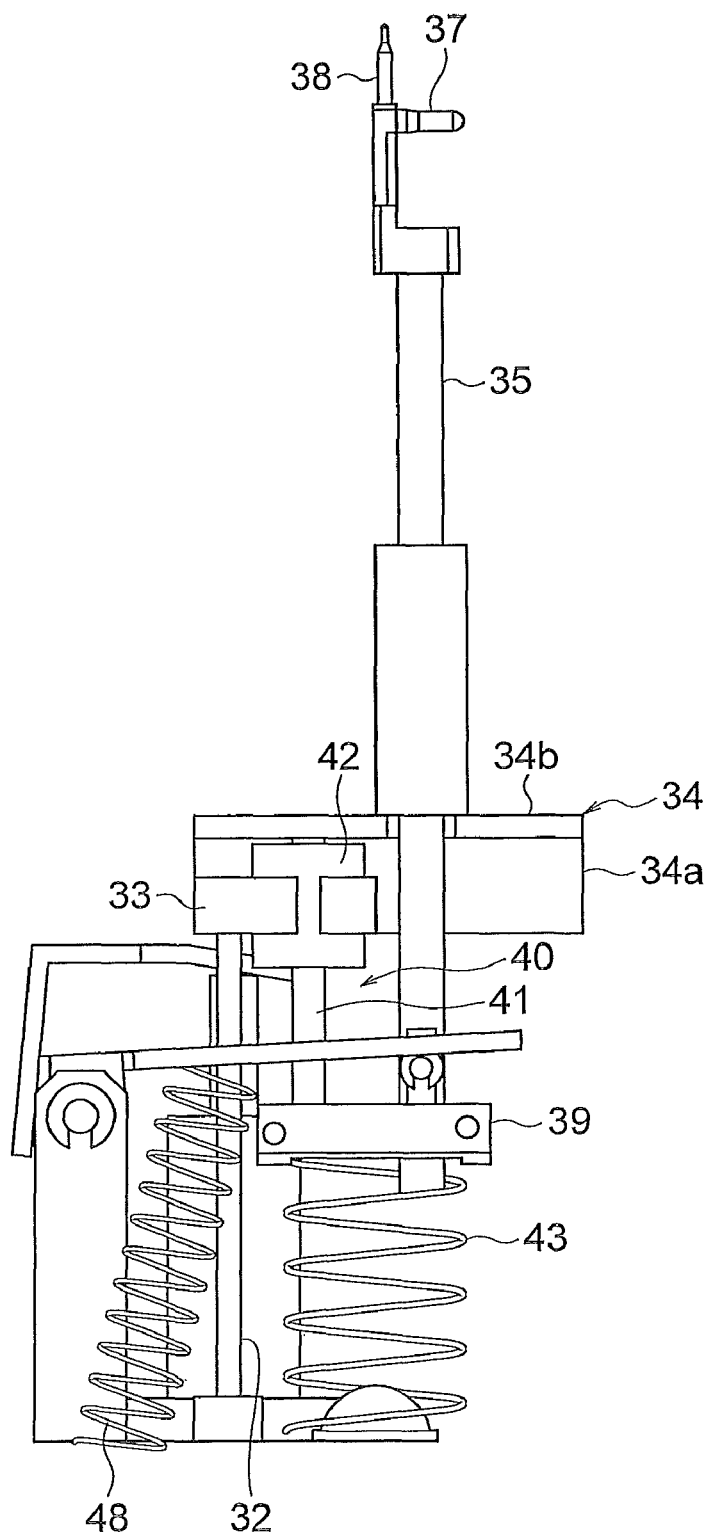
FIG. 13 is an explanatory view of a linear scale of the elevating mechanism of FIG. 11.
Figure 14:
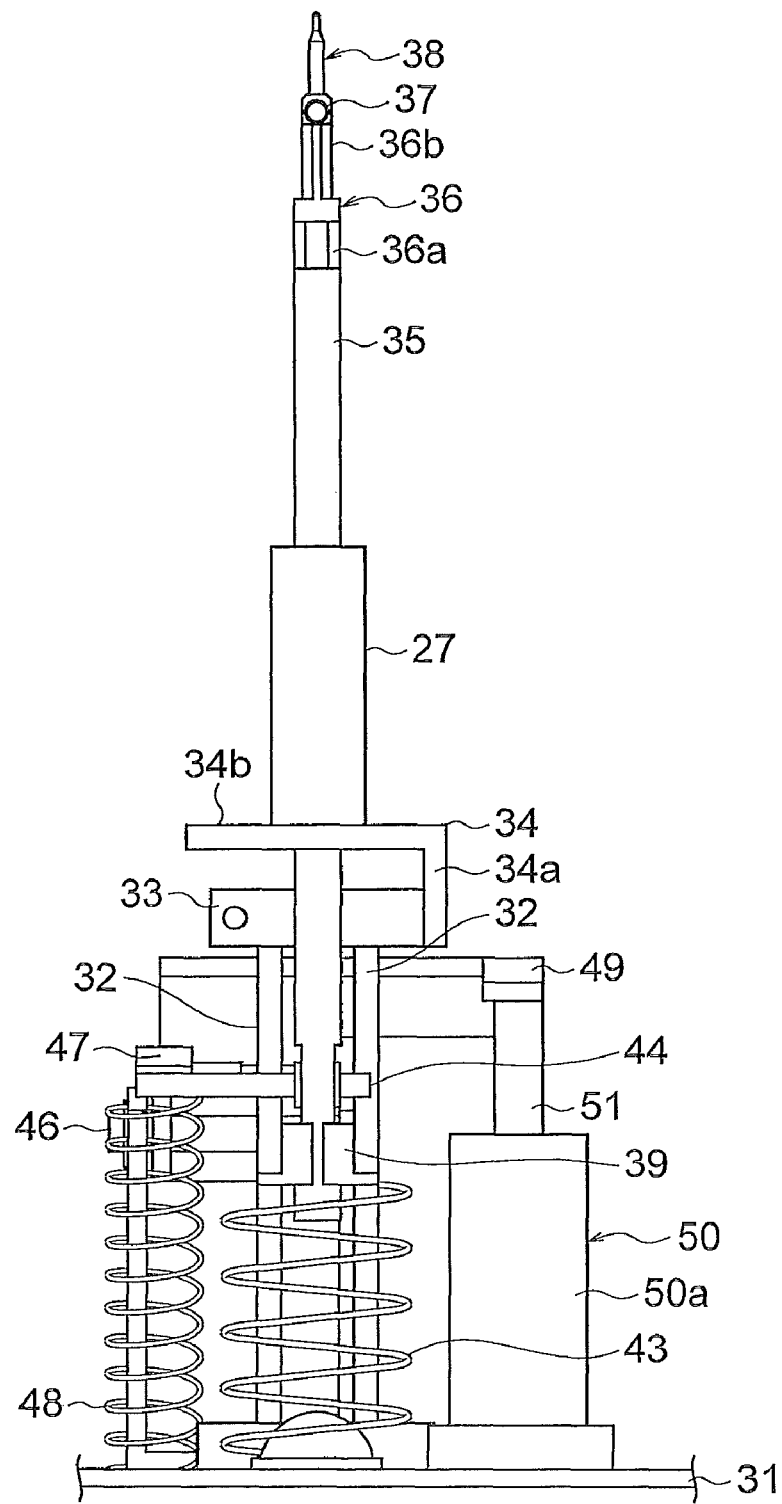
FIG. 14 is a right side view of FIG. 13.

As shown in FIGS. 6 to 8, a bracket 39 is fixed to the lower end of the feeler shaft 35. Moreover, as shown in FIG. 13, a linear scale (a position measuring unit) 40 detecting a vertical movement position is provided between the bracket 39 and guide supporting member 34 as a height detection sensor (a height detector).

The linear scale 40 includes a shaft-shaped main scale 41 and a detection head 42. The main scale 41 is provided in parallel to the feeler shaft 35 to extend vertically. The detection head 42 detects the vertical movement positions of the feelers 37 and 38 based on the amount of vertical movement of the main scale 41. The upper end of the main scale 41 is fixed to the holding member 33, and the lower end thereof is fixed (or held) to the bracket 39.

The detection head 42 is held by the holding member 33. The linear scale 40 is also of a magnetic or optical type similar to the aforementioned linear scale 24.

As shown in FIGS. 6 to 8, a coil spring 43 biasing the feeler shaft 35 upward is provided between the bracket 39 and horizontal plate (bottom plate) 31. Furthermore, an engagement shaft 44 is attached to the lower end of the feeler shaft 35. The engagement shaft 44 is placed above the bracket 39 and is perpendicular to the feeler shaft 35.

On the horizontal plate (bottom plate) 31, as shown in FIG. 6, a U-shaped bracket 45 is fixed. Both ends of a supporting shaft 46 are held by opposite walls 45a and 45a of the bracket 45 so as to rotate around the axis line. A holding lever 47 is fixed to the supporting shaft 46 and is caused to abut on upper part of the engagement shaft 44.

A tension coil spring 48 for pulling down the holding lever 47 is provided between the holding lever 47 and horizontal plate 31. Tension spring force of the tension coil spring 48 is set larger than spring force of the coil spring 43.

A vertical position control lever 49 is fixed on the supporting shaft 46. The vertical position control lever 49 is used to control the position to which the engagement shaft 44 is raised by the holding lever 47 and used to set positions to which the feeler shaft 35, lens frame feeler 37, and lens shape feeler 36 are raised. The vertical position control lever 49 extends in a same direction as the holding lever 47 extends.

Below the vertical position control lever 49, an actuator motor 50 is provided. The actuator motor 50 includes a motor body 50a fixed on the horizontal plate 31; and a shaft 51 which protrudes upward from the motor body 50a and includes an axis line in parallel to the feeler shaft 35. The vertical position control lever 49 is caused to abut on the upper end of the shaft 51 by the tension spring force of the tension coil spring 48.

Here, the actuator motor 50 is also a pulse motor. The actuator motor 50 is configured to operate forward to advance the shaft 51 upward and operate backward to move the shaft 51 downward.

The coil spring 43, supporting shaft 46, holding lever 47, tension coil spring 48, vertical position control lever 49, actuator motor 50, and the like constitute a mechanism of raising the feelers 37 and 38.

<Control Circuit>

Figure 10B:
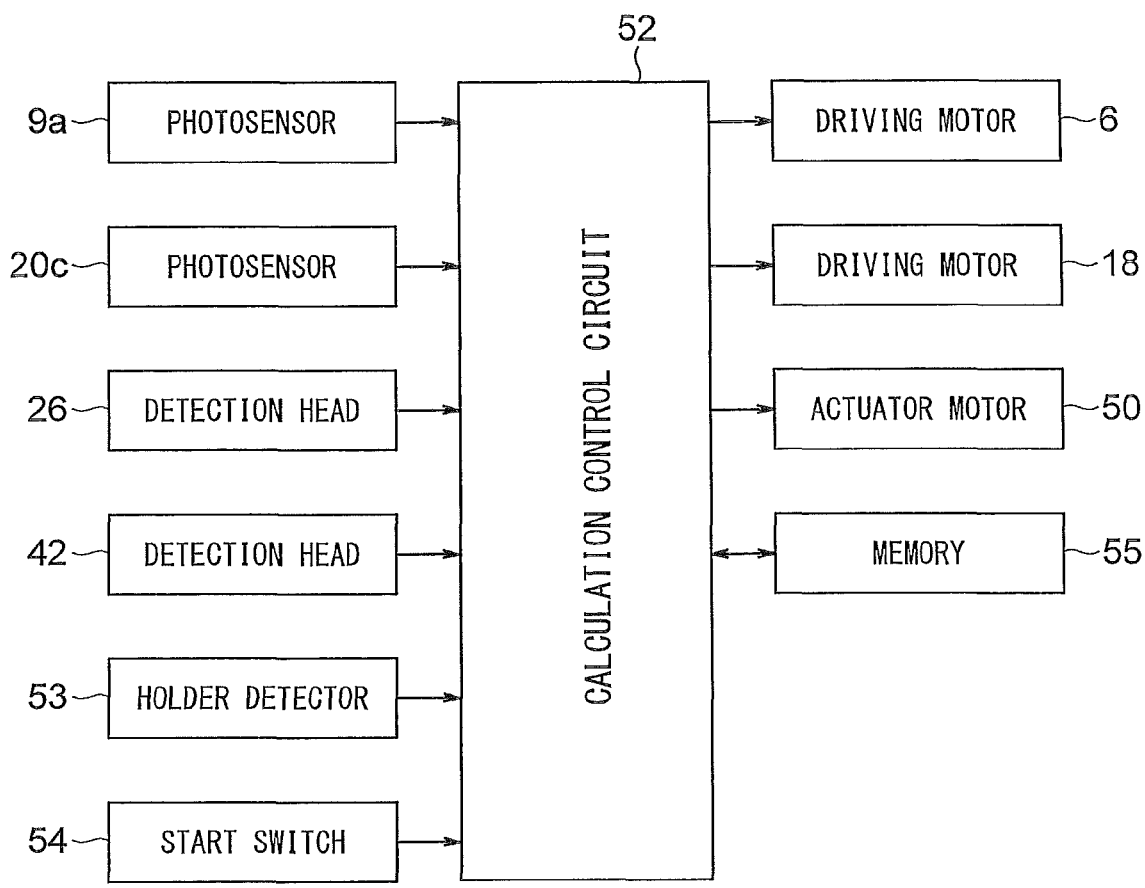
FIG. 10B is a control circuit diagram of the lens shape measuring apparatus shown in FIG. 1.
Figure 11:
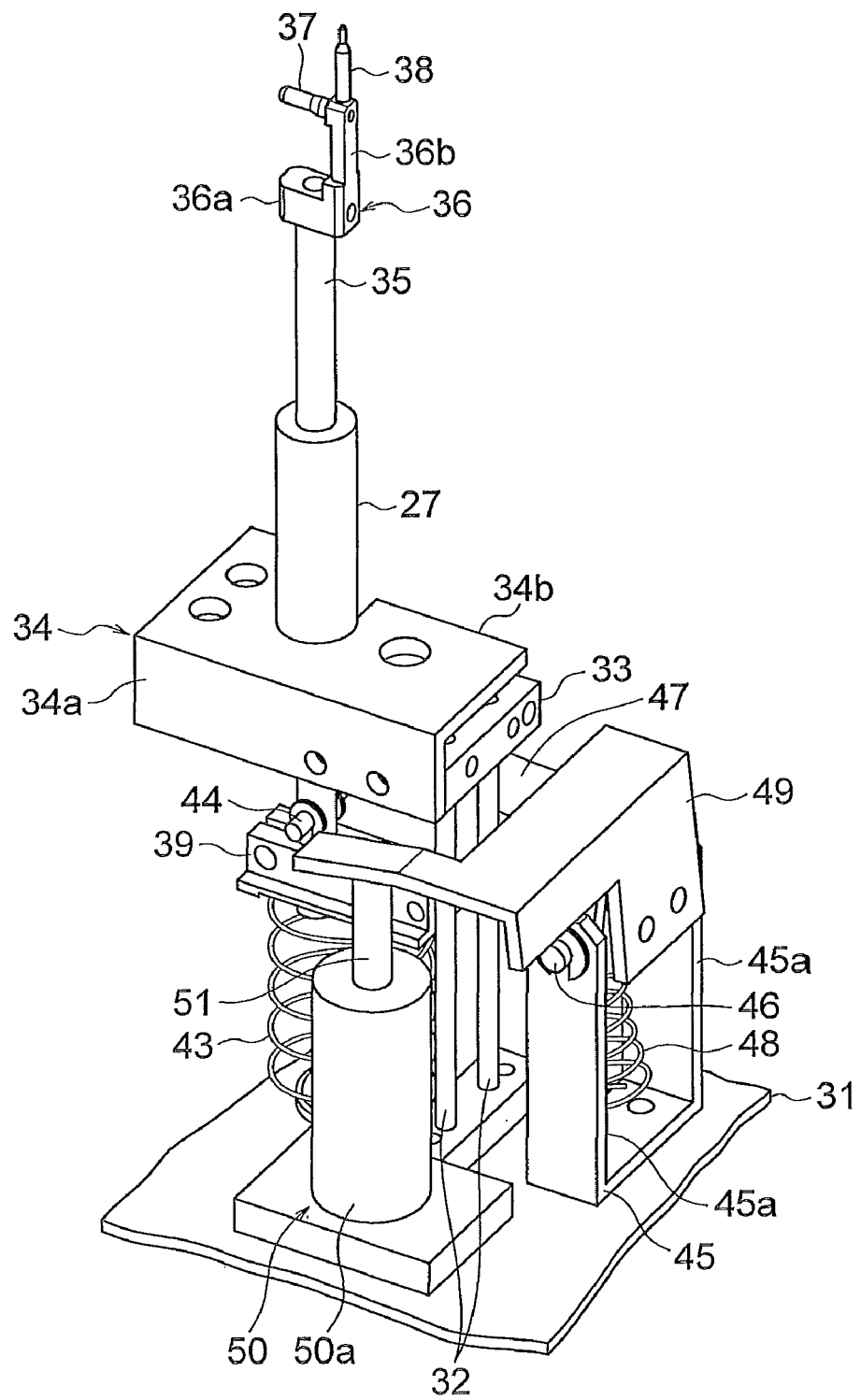
FIG. 11 is a perspective view for explaining an operation of the feeler elevating mechanism of FIG. 6.

As shown in FIG. 10B, an origin detection signal from the aforementioned photosensor (origin detector) 9a, an origin detection signal from the photosensor (origin detector) 20c, a movement amount detection signal (position detection signal) from the detection head 26 of the linear scale 24, a movement amount detection signal (position detection signal) from the detection head 42 of the linear scale 40, and the like are inputted to a calculation control circuit (a calculation controller, a control circuit) 52. The calculation control circuit 52 is configured to operate and control the drive motors 6 and 18 and actuator motor 50.

Moreover, as described later, the calculation control circuit 52 corrects the results of shape measurement of spectacle lens frames with a large curved angle according to the axial shift amount or angle, and outputs the corrected shape measurement result.

A holder detector 53 is provided on a side wall of one of the slide frames 3 and 3 as shown in FIG. 1A. The holder detector 53 is composed of a micro switch or the like. A detection signal from the holder detector 53 is inputted to the calculation control circuit 52 as shown in FIG. 10B.

In FIG. 10B, a reference numeral 54 denotes a start switch for starting measurement; and 55, a memory connected to the calculation control circuit 52.

[Operation]

Hereinafter, operation of such a lens shape measuring apparatus will be described.

(A). Regarding Spectacle Frame

There are two types of spectacle frames, a rim-type frame and a rimless-type frame.

The rim-type spectacle frame includes a frame main body and right and left temples. The frame main body is formed of a left lens frame (left annular rim) and a right lens frame (right annular rim) integrally connected with a bridge. The right and left temples are mounted on the ear sides of the left and right lens frames, respectively, of the frame main body. In addition, the left and right lens frames each have a lens fitting groove which extends annularly along the inner peripheral surface of the corresponding lens frame and which is formed to have a substantially V-shaped cross-section. In spectacles with such lens frames, each spectacle lens is fitted into the lens frame in a way that a lens fitting protrusion having a triangular cross-section and protruding annularly on the peripheral surface of the spectacle lens engages with the lens fitting groove of the lens frame.

The rimless-type spectacle frames are classified into a semi-rimless frame (grooved frame) having partial rims and a rimless frame having no rim.

The semi-rimless frame includes a rim bar (frame main body) and left and right temples. The rim bar is formed of left and right upper-half rims integrally connected with a bridge. The left and right temples are mounted on left and right edges (on the ear sides), respectively, of the rim bar.

The rimless frame includes a bridge and left and right temples. The bridge fixes left and right spectacle lenses on the nose sides. The left and right temples are mounted on the ear sides of the left and right spectacle lenses, respectively.

In spectacles with the semi-rimless frame (grooved frame), each of the spectacle lenses is suspended and held by a resin band (suspension string) in a way that a band groove is formed in the lower half of the outer peripheral surface of the spectacle lens and that each end portion of the resin band (suspension string) provided to the band groove is fixed to the corresponding upper-half rim bar. Meanwhile, in spectacles with the rimless frame, the bridge is fixed to the nose sides of the left and right spectacle lenses by using screws, and the left and right temples are fixed to portions on the ear sides of the left and right spectacle lenses, respectively, by using screws.

The inner peripheral surface shape of the above-described lens frame (i.e., the shape of the lens fitting groove, which corresponds to the lens frame shape) and the outer shape (outer peripheral surface shape) of the spectacle lens are known as a lens shape used during spectacle lens processing. Note that examples of the spectacle lens include: lenses actually produced on the basis of a prescription for eyes of those who will wear the spectacles; and plano lenses mounted on (held by) a spectacle frame for the purpose of display at opticians and the like (hereinafter, simply referred to as dummy lens).

(B). Measurement of Average-Sized or Normal Lens Shape (I) Measurement of Lens Frame Shape Before measurement of the shape of lens frames of spectacles or measurement of the shape of a lens such as a demo lens is performed by the lens shape measuring apparatus, the upper end of the shaft 51 of the actuator motor 50 is positioned at the bottom end (a bottom dead point) as shown in FIGS. 6 to 8. At this position, the holding lever 47 is biased by the tension coil spring 48 having stronger spring force than that of the coil spring 43 so as to rotate downward around the supporting shaft 46. The holding lever 47 therefore presses down the feeler shaft 35 through the engagement shaft 44. The lens frame feeler 37 and lens shape feeler 36 are thus positioned at the lowest end.

In the case of performing the measurement of the shape of the lens frames of spectacles with the lens shape measuring apparatus in the aforementioned state, as disclosed in Japanese Patent Application Publication No. H10-328992, for example, a spectacle frame MF including right and left lens frames LF and RF in FIG. 7 is placed between the slide frames 3 and 3 of FIG. 1A (the spectacle frame MF is not shown in FIG. 1A), and the lens frames LF and RF are sandwiched by the holding bars 3b1 and 3b2 as shown in FIG. 7. This is the same as that of Japanese Patent Application Publication No. H10-328992.

The lens frame LF (RF) held between the holding bars 3b1 and 3b2 is set above the lens frame feeler 37 before the measurement starts as shown in FIG. 7. Specifically, the lens frame feeler 37 is positioned at an initial position (α) below the lens frame LF (RF). Moreover, as shown in FIG. 7, the lens frame feeler 37 and attachment hole feeler 38 are positioned so as to correspond to an initial position (i) located substantially in the center of the lens frame LF (RF) held between the holding bars 3b1 and 3b2.

At this position, the photosensor 9a detects the origin of horizontal rotation of the rotation base 9 based on the light beam from the light emitter 9b, and the origin sensor 20a detects the origin of movement of the slider 15.

Even if the lens frame three-dimensionally curves, the part of the lens frame held by the holding bars 3b1 and 3b2 is set lower than the other part. At the held part, a lens fitting groove Ym of the lens frame Lf (RF) has a set height, which is a lens frame shape measurement start position G.

When the start switch 54 of FIG. 10B is turned on at this state, the calculation control circuit 52 causes the actuator motor 50 to run forward and advance (raise) the shaft 51 upward from the position shown in FIGS. 6 to 8 to the position shown in FIGS. 11 to 14 by a predetermined amount. At this time, the shaft 51 raises the free end of the vertical position control lever 49 upward by a predetermined amount against spring force of the tension coil spring 48 so as to integrally rotate the vertical position control lever 49 and supporting shaft 46.

The holding lever 47 is then rotated integrally with the supporting shaft 46, and the free end of the holding lever 47 is raised upward by a predetermined amount. Upon the free end of the holding lever 47 being raised, the engagement shaft 44 is raised by spring force of the coil spring 43 following the free end of the holding lever 47, and the feeler shaft 35 is thereby raised by a predetermined amount.

The amount of rise of the prove shaft 35, or the amount by which the shaft 51 is advanced (raised) by the actuator motor 50 is an amount L by which the top of the lens frame feeler 37 rises from the initial position (α) of FIG. 7 to a height (β) corresponding to the height of the lens fitting groove Ym at the aforementioned shape measurement start position G.

Figure 12:
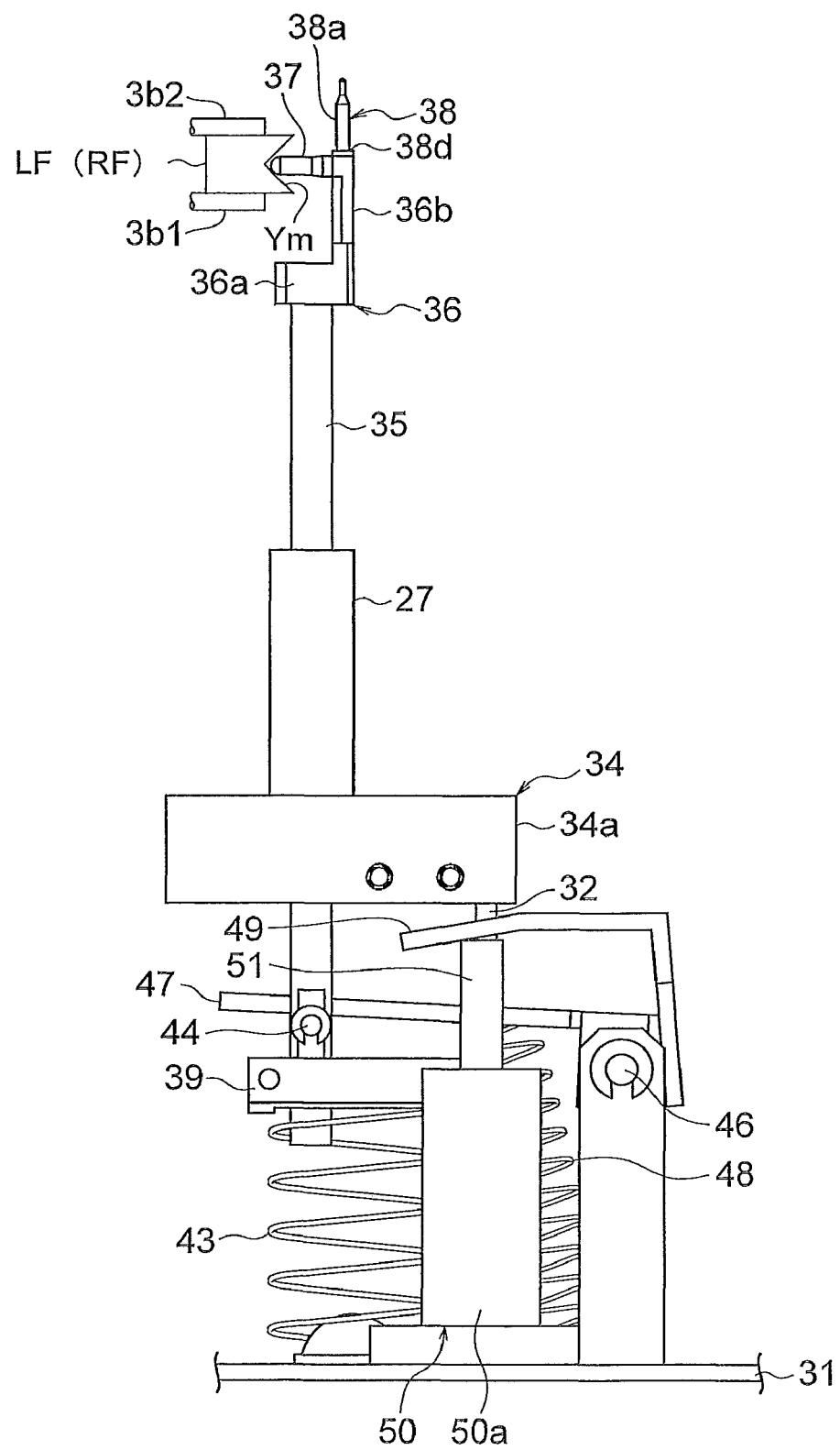
FIG. 12 is an explanatory view for measurement of the lens frames by the elevating mechanism of FIG. 11.

The calculation control circuit 52 then drives and controls the driving motor 18 to rotate the driving pulley 19 and move the slider 15 along the guiderail 14 with the wire 20 of FIGS. 2 and 5C. At this time, the slider 15 is moved in a direction of an arrow A1 in FIG. 7. The movement is performed until the tip of the lens frame feeler 37 is abutted on the lens fitting groove Ym at the shape measurement starting position G as shown in FIG. 12. Moreover, in the state where the tip of the lens frame feeler 37 is in contact with the lens fitting groove Ym, the lens frame feeler 37 is brought into an elastic contact with the lens fitting groove Ym by the spring force of the coil spring 23. In this state, the driving motor 18 is stopped.

When the tip of the lens frame feeler 37 comes into contact with the lens fitting groove Ym, the load on the driving motor 18 increases, and the current flowing the driving motor 18 increases. By detecting this change in current, the calculation control circuit 52 can detect that the tip of the lens frame feeler 37 comes into contact with the lens fitting groove Ym and stop the driving motor 18.

Figure 15:
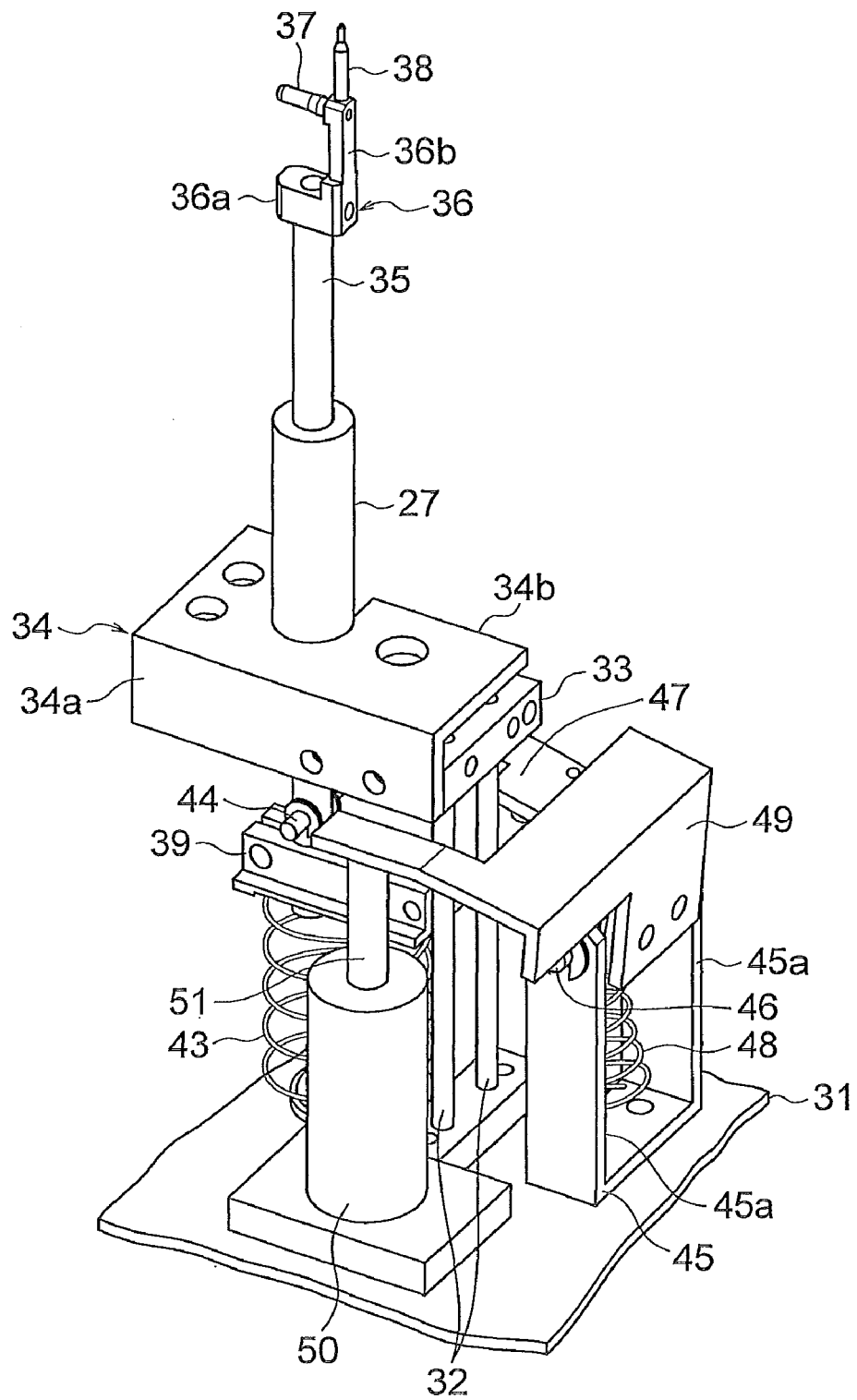
FIG. 15 is a perspective view for explaining an operation of the feeler elevating mechanism of FIG. 6.
Figure 16:
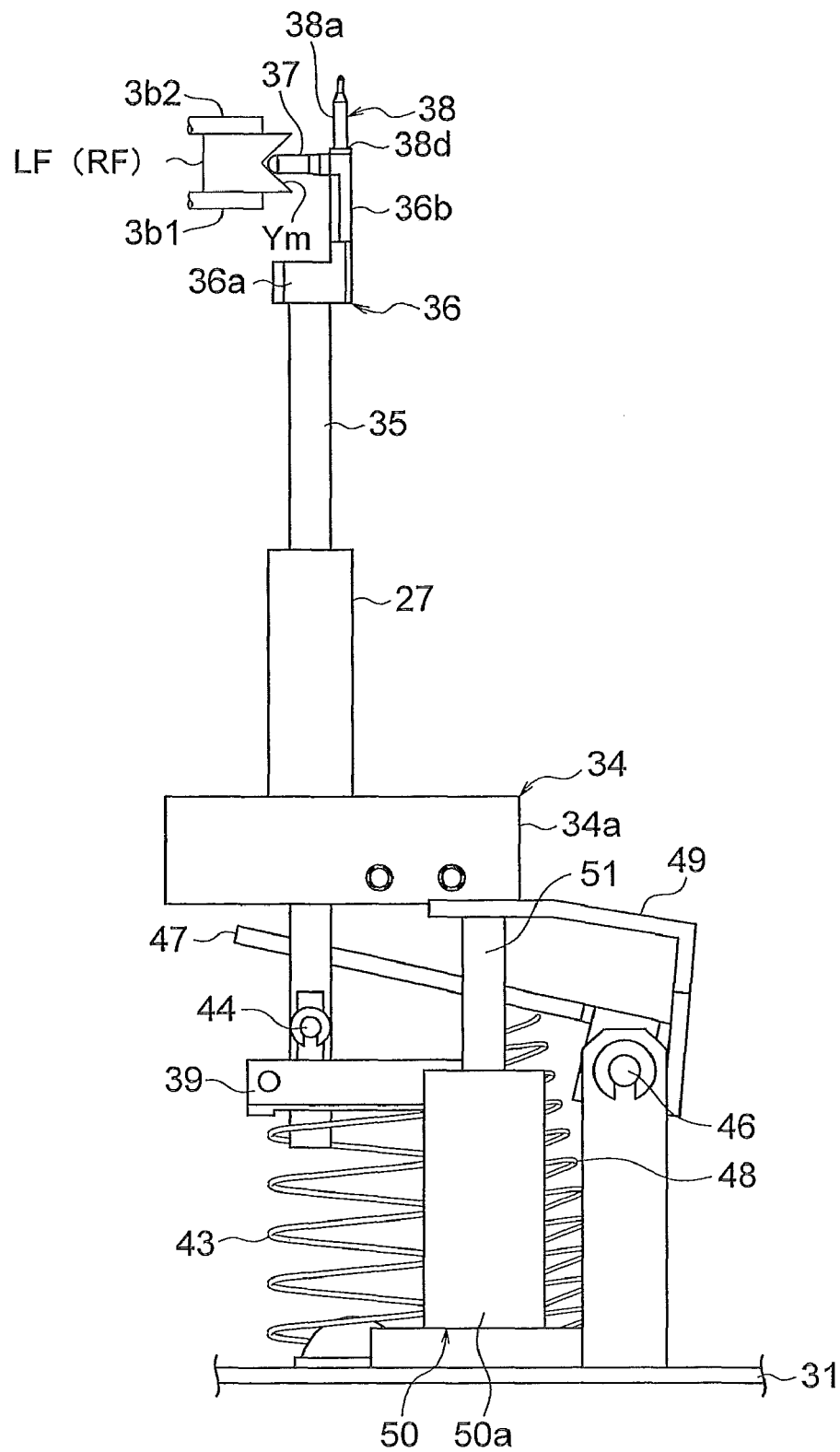
FIG. 16 is an explanatory view for measurement of the lens frames by the elevating mechanism of FIG. 15.
Figure 17:
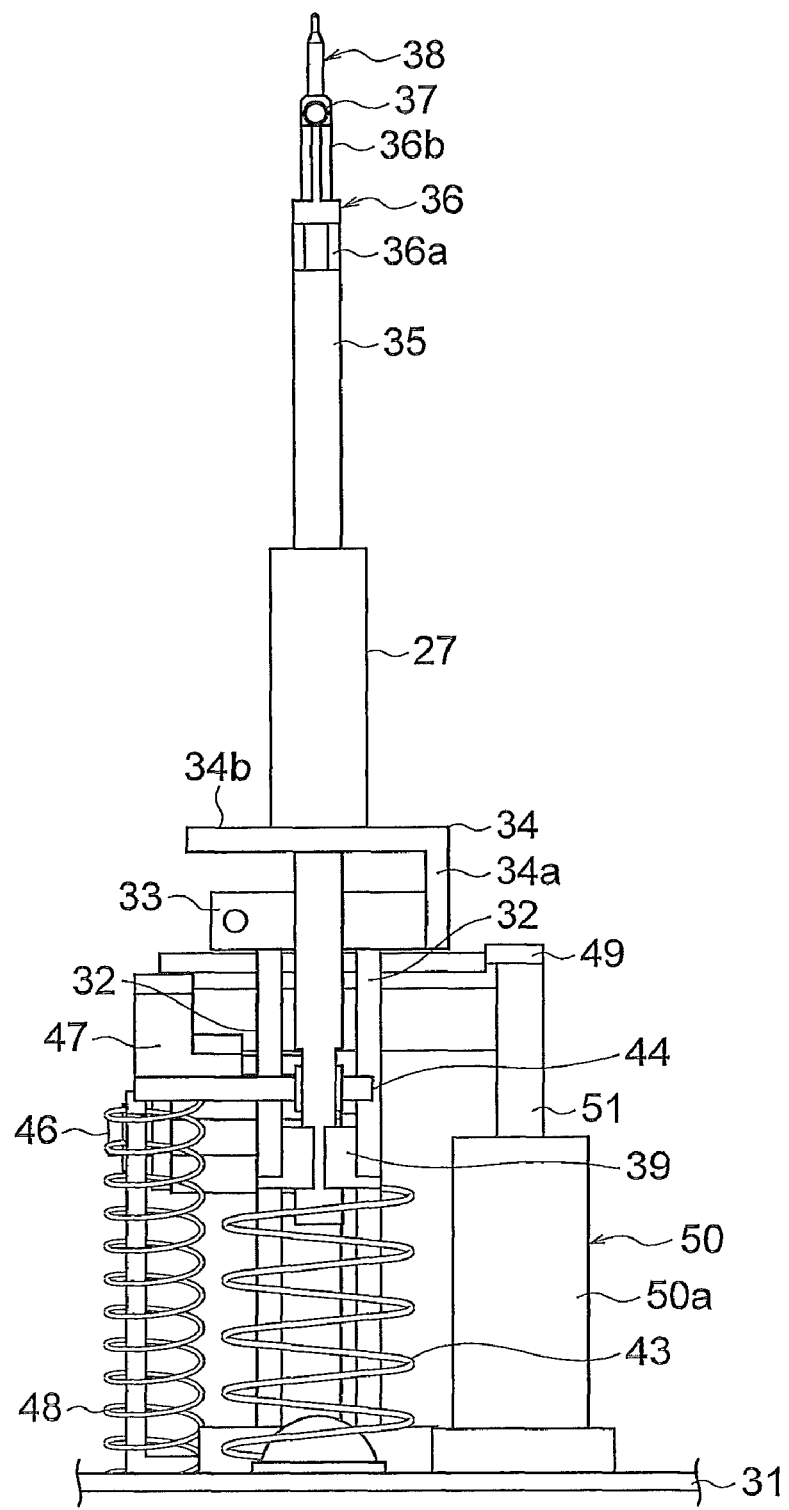
FIG. 17 is a left side view of FIG. 16.

Thereafter, the calculation control circuit 52 causes the actuator motor 50 to run forward and advances (raises) the shaft 51 upward from the position in FIGS. 11 to 14 to the position in FIGS. 15 to 17 by a predetermined amount. At this time, the shaft 51 raises the free end of the vertical position control lever 49 upward against the spring force of the tension coil spring 48 by a predetermined amount to rotate the vertical position control lever 49 integrally with the supporting shaft 46.

The holding lever 47 is then rotated integrally with the supporting shaft 46, and the free end thereof is raised upward by a predetermined amount and is separated from the engagement shaft 44 by a predetermined amount. The feeler shaft 35 can therefore move vertically.

Next, the calculation control circuit 52 drives and controls the driving motor 6 to cause the driving motor 6 to run forward. The rotation of the driving motor 6 is transmitted through the pinion 7 and timing belt 8 to the driven gear 5, which is then horizontally rotated integrally with the rotation base 9 (see FIG. 5B).

Along the rotation of the rotation base 9, the slider 15 and a number of parts provided for the slider 15 are horizontally rotated integrally with the rotation base 9, and the tip of the lens frame feeler 37 slides and moves along the lens fitting groove Ym. At this time, the slider 15 moves along the guiderail 14 integrally with the lens frame feeler 37. Accordingly, the amount of movement of the slider 15 from the origin position of the slider 15 is equal to the amount of movement of the tip of the lens frame feeler 37. This amount of movement is calculated from the detection signal of the detection head 26 of the linear scale 24 by the calculation control circuit 52.

Moreover, the dimension (length) between the center of the feeler shaft 35 and the tip of the lens frame feeler 37 is known. Accordingly, by previously setting the distance between the rotational center of the rotation base 9 and the tip of the lens frame feeler 37 when the slider 15 is located at its origin, a change in distance between the rotational center of the rotation base 9 and the tip of the lens frame feeler 37 as the slider 15 moves along the guiderail 14 can be a radius ρi.

Accordingly, the rotation angle θi of the rotation base 9 due to the rotation of the driving motor 6 is calculated from the number of driving pulses of the driving motor 6, and the radius ρi corresponding to the calculated rotation angle θi is obtained, thus obtaining the circumferential shape of the lens fitting groove Ym of the lens frame LF (RF) (lens frame shape) as lens frame shape information (θi, ρi) in the polar coordinate system.

Moreover, while the tip of the lens frame feeler 37 slides and moves along the lens fitting groove Ym of the lens frame LF (RF) which is curved in the vertical direction, the curve in the vertical direction is obtained as an amount of vertical displacement based on the detection signal of the detection head 42 of the linear scale 40 by the calculation control circuit 52. This amount of vertical displacement is indicated by a vertical position Zi.

Accordingly, the lens frame shape of the lens frame LF (RF) can be calculated by the calculation control circuit 52 as three-dimensional lens frame shape information (θi, ρi, Zi). The thus-obtained three-dimensional lens frame shape information (θi, ρi, Zi) is stored in a memory 55 by the calculation control circuit 52.

In this embodiment, at the lens frame shape measurement, the motor 409 is caused to run forward or backward and moves the belt 408 wound around the driving skid 410 in the right or left direction as shown in FIGS. 1F and 1D, thus swinging the entire slide frame 3 around the virtual axis 402 in the direction of the arrow D.

Moreover, for example, a highly curved frame for a +8 or more (up to +12) base curve lens, for example, is automatically inclined to prevent the feeler from being disengaged from the lens fitting groove of the frame and allow measurement of the bottom of the lens fitting groove. It is therefore possible to accurately measure also the frame PD.

Moreover, by swinging the entire slide frame 3 around the virtual axis approximated to the center of curvature of the curve of the frame, the frame for a +8 base curve lens can be horizontally held. Accordingly, the feeler can be accurately engaged with the lens groove, and the frame (lens frame) shape can be measured accurately.

(II) Measurement of Lens Shape of Demo Lens (II-a) Setting of Lens of Demo Lens

Figure 23A:
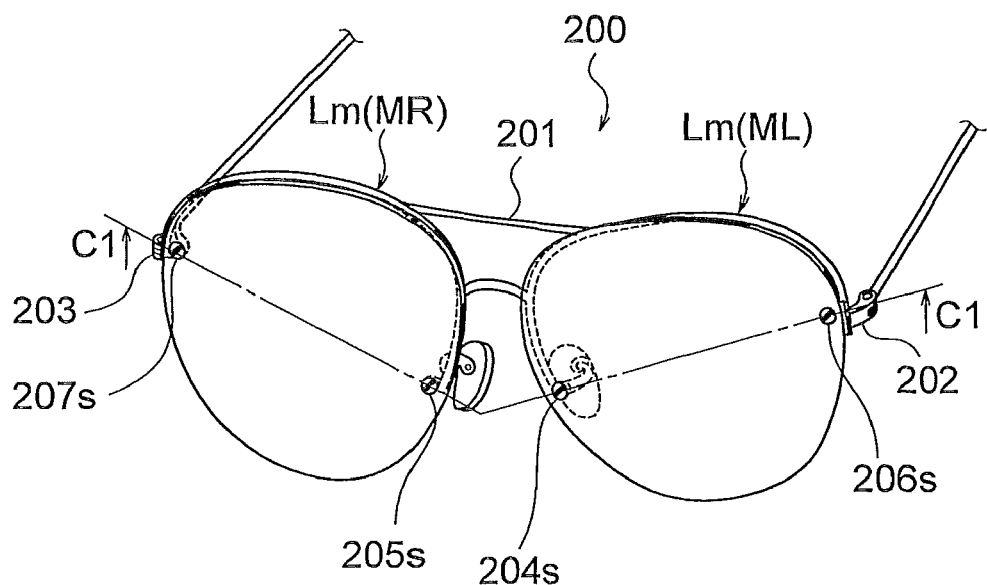
FIG. 23A is a perspective view showing an example of spectacles with a two-point frame.
Figure 23B:
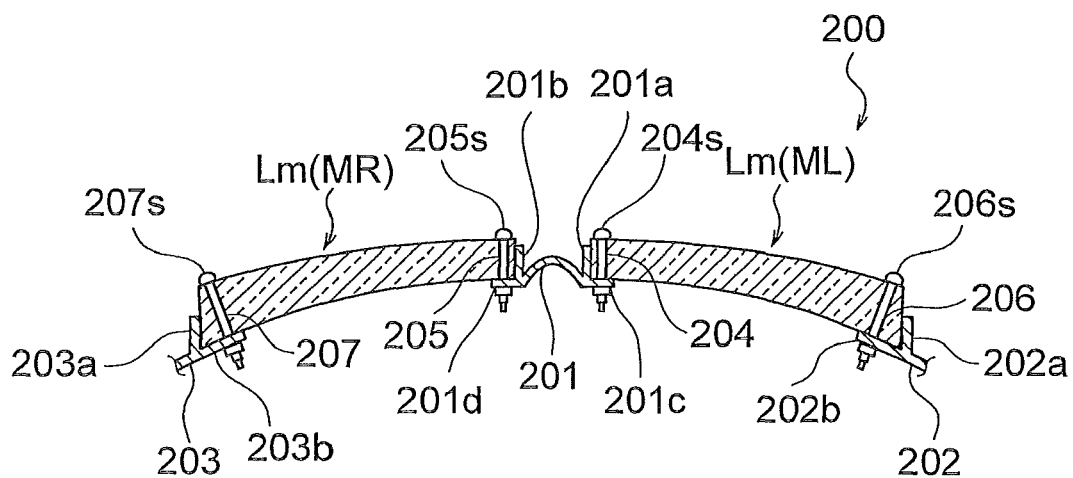
FIG. 23B is a cross-sectional view taken along a line C1-C1 of FIG. 23A.

In the case of performing shape measurement of right and left lenses Lm (MR) and Lm (ML) (demo lenses as dummies of spectacle lenses) of spectacles M with a two-point frame as shown in FIGS. 23A and 23B by the lens shape measuring apparatus, known lens holders disclosed in Japanese Patent Application Publications No. H10-328992 and No. H8-294855 and the like can be used. To cause a lens holder of Japanese Patent Application Publication No. H10-328992 to hold a lens such as the demo lens, it is possible to employ a sucker and a sucker holding structure as disclosed in Japanese Patent Application Publication No. H8-294855. The structure of the lens holder is not essential for this invention, and thus the detailed description thereof is omitted.

The aforementioned lens holder holding lenses such as demo lenses is provided between the slide frames 3 and 3, and a side wall of the lens holder of Japanese Patent Application Publication No. H10-328992 or a flange in side part of the lens holder of Japanese Patent Application Publication No. H8-294855 is sandwiched between the fixed holding bars 3b1 and movable holding bars 3b2. At this time, the lenses held by the lens holder face downward.

In spectacles 200 with a two-point frame as shown in FIG. 23A, a bridge 201 is provided between the right and left lenses MR and ML (on the nose side), and temple clasps 202 and 203 are provided on opposite sides (on ear sides) of the right and left lenses Lm (MR) and Lm (ML).

As shown in FIG. 23B, the bridge 201 includes: side plates 201a and 201b abutting on circumferential surfaces (cutting surfaces) of the lenses Lm (ML) and Lm (MR) on the nose side (edges of the circumferential surfaces facing each other), respectively; and fixed plates 201c and 201d abutting on rear refractive surfaces of the lenses Lm (ML) and Lm (MR), respectively.

As shown in FIG. 23B, the temple clasp 202 includes: a side plate 202a abutting on the circumferential surface (cutting surface) of the lens Lm (ML) on the ear side; and a fixing plate 202b abutting on the rear refractive surface of the lens Lm (ML). The temple clasp 203 includes: a side plate 203a abutting on the circumferential surface (cutting surface) of the lens Lm (MR) on the ear side; and a fixing plate 203b abutting on the rear refractive surface of the lens Lm (MR).

As shown in FIG. 23B, at edges of the lenses Lm (MR) and Lm (ML) on the nose side (edges facing each other), attachment holes 204 and 205 are formed. At edges of the lenses Lm (MR) and Lm (ML) on the ear side, attachment holes 206 and 207 are formed.

The left side plate 201a of the bridge 201 is fixed to the lens Lm (ML) with a screw 204s inserted through the attachment hole 204, and the right side plate 201b of the bridge 201 is fixed to the lens Lm (MR) with a screw 205s inserted through the attachment hole 205. Furthermore, the fixing plate 202b of the temple clasp 202 is fixed to the lens Lm (ML) with a screw 206s inserted through the attachment hole 206, and the fixing plate 203b of the temple clasp 203 is fixed to the lens Lm (MR) with a screw 207s inserted through the attachment hole 207. In the following description, the lenses Lm (ML) and Lm (MR) are just referred to as the lens Lm.

(II-b) Operation 1; Bringing Lens Shape Feeler 36 into Contact with Standard Lens When the lens holder (not shown) is detected by the holder detector 53, the detection signal is inputted to the calculation control circuit 52. The calculation control circuit 52 then causes the slider 15 to move forward from its origin position along the guiderail 14 and locate the lens shape feeler 36 on the outside of the circumference of the lens held by the lens holder (not shown).

Next, the calculation control circuit 52 causes the actuator motor 50 to run forward as described above and raises the lens frame feeler 37 from the initial position (α) to the height (β) described in FIG. 7. Along with this, the lens shape feeler 36 is raised integrally with the lens frame feeler 37 up to the height corresponding to the circumference of the lens held by the lens holder (not shown).

Figure 18:
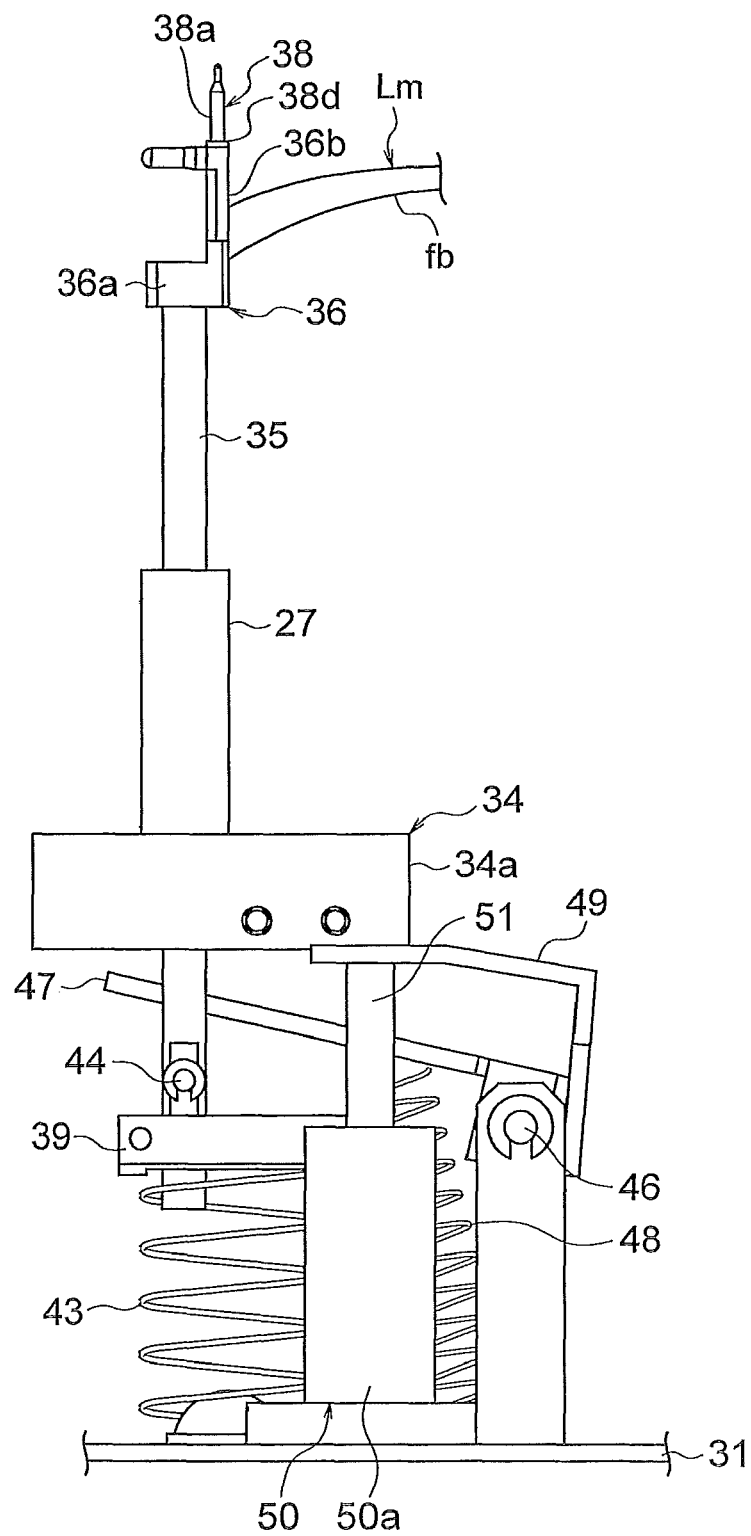
FIG. 18 is an explanatory view of lens shape measurement by the elevating mechanism of FIG. 2.

Subsequently, the calculation control circuit 52 drives and controls the driving motor 18 to transmit the rotation of the driving motor 18 to the slider 15 through the wire 20 and control and move the slider 15 along the guiderail 14 until the lens shape feeler 36 touches the circumferential surface of the lens Lm held by the lens holder (not shown) as shown in FIG. 18. Thereby, as shown in FIG. 18, the lens shape feeler 36 is brought into contact with the circumferential surface of the lens Lm.

The aforementioned control can be conducted based on data of a standard lens previously obtained by experiments and the like.

(II-c) Operation 2: Bringing Lens Shape Feeler 36 into Contact with Lens

The procedure to bring the lens shape feeler 36 into contact with the circumferential surface of the lens Lm may be another one. Specifically, first, the actuator motor 50 is caused to run forward to raise the free end of the vertical position control lever 49 upward from the position in FIG. 7 to the position in FIGS. 15 to 17 against the spring force of the tension coil spring 48, thus rotating the supporting shaft 46. At this time, the supporting shaft 46 rotates the holding lever 47 to raise the free end of the holding lever 47 in the direction that the free end of the vertical position control lever 49 is raised. Along with such an operation, the engagement shaft 44 is raised by the spring force of the coil spring 43 integrally with the feeler shaft 35, and the lens shape feeler 36 is raised and brought into contact with the rear refractive surface of the lens Lm. Thereafter, the driving motor 18 is driven and controlled to move the slider 15 along the guiderail 14 at a predetermined speed and move the lens shape feeler 36 along the rear refractive surface toward the rim of the lens Lm. The lens shape feeler 36 is thus moved to the position greatly deviated from the rim of the rear refractive surface of the lens Lm. At this time, even if the lens shape feeler 36 is separated from the rim of the rear refractive surface of the lens Lm and is raised by the spring force of the coil spring 43 integrally with the lens frame feeler 37, it is possible to prevent the lens frame feeler 37 from colliding with the lens Lm by setting the moving speed of the lens shape feeler 36 to be fast to some extent because the spring force of the coil spring 43 is weak.

The separation position at which the lens shape feeler 36 is separated from the rear refractive surface of the lens Lm can be judged by detecting with the linear scale 40 the position where the lens shape feeler 36 is raised. The horizontal position of the lens shape feeler 36 located at the separation position is obtained from the detection signal of the linear scale 24. Accordingly, by the detection signals from the linear scales 24 and 40 when the lens shape feeler 36 is located at the separation position, the position where the lens shape feeler 36 is separated from the rear refractive surface of the lens Lm can be calculated as three-dimensional coordinate data. Based on the three-dimensional coordinate data, the actuator motor 50 is driven and controlled to adjust the free end of the vertical position control lever 49 and therefore adjust the free end of the holding lever 47, thus adjusting the lens shape feeler 36 to a height corresponding to the circumference of the lens Lm held by the lens holder (not shown). Thereafter, the calculation control circuit 52 drives and controls the driving motor 18 to transmit the rotation of the driving motor 18 through the wire 20 to the slider 15. The slider 15 is then controlled and moved along the guiderail 14 so that the lens shape feeler 36 may move until touching the circumferential surface of the lens Lm held by the lens holder (not shown). Thereby, as shown in FIG. 18, the lens shape feeler 36 is brought into contact with the circumferential surface of the lens Lm.

(II-d) Shape Measurement of Rim by Lens Shape Feeler 36

Next, the calculation control circuit 52 drives and controls the driving motor 6 to cause the driving motor 6 to run forward. Rotation of the driving motor 6 is transmitted through the pinion 7 and timing belt 8 to the driven gear 5, which is then horizontally rotated integrally with the rotation base 9.

Along the rotation of the rotation base 9, the slider 15 and a number of parts provided for the slider 15 are horizontally rotated integrally with the rotation base 9, and the lens shape feeler 36 slides and moves along the circumferential surface (cutting surface) of the lens Lm. At this time, the slider 15 moves along the guiderail 14 integrally with the lens frame feeler 37. Accordingly, the amount of movement of the slider 15 from the origin position of the slider 15 is equal to the amount of movement of the tip of the lens frame feeler 37. This amount of movement is calculated from the detection signal of the detection head 26 of the linear scale 24 by the calculation control circuit 52.

Moreover, the dimension (length) between the center of the feeler shaft 35 and the tip of the lens frame feeler 37 is known. Accordingly, by previously setting the distance between the rotational center of the rotation base 9 and the tip of the lens frame feeler 37 when the slider 15 is located at its origin, a change in distance between the rotational center of the rotation base 9 and the lens shape feeler 36 as the slider 15 moves along the guiderail 14 can be the radius $\rho i$.

Accordingly, by calculating the rotation angle $\theta i$ of the rotation base 9 due to the rotation of the driving motor 6 from the number of driving pulses of the driving motor 6 and obtaining the radius $\rho i$ corresponding to the calculated rotation angle $\theta i$, the circumferential shape of the lens Lm (lens shape) can be obtained as the lens shape information ($\theta i$, $\rho i$) in the polar coordinate system.

[Detection of Recess in Rim of Lens]

Figure 30A:
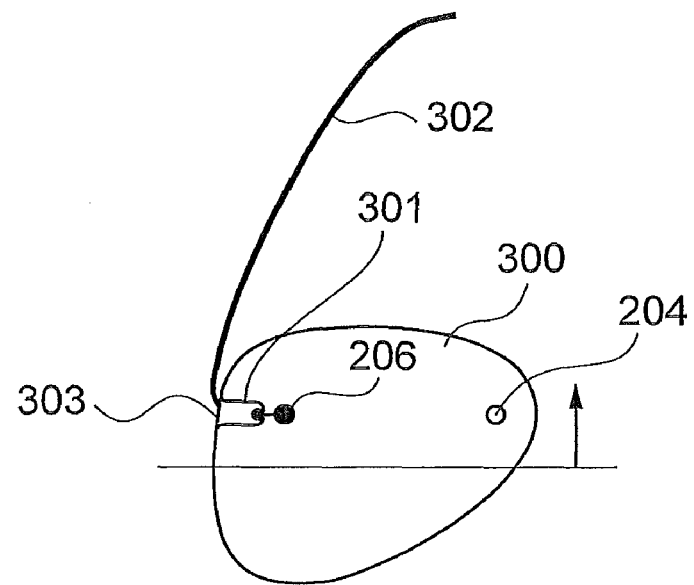
FIG. 30A is an explanatory view showing a modification.

As shown in FIG. 30A, in a kind of two-point frames, a clasp 303 through which a temple 302 is attached is attached using a recess 301 (see FIG. 30B) provided for the rim of a lens 300. Referential numerals 206 and 204 denote attachment holes for attachment of clasps.

When such a lens is measured, the lens data includes a recess. Generally, the recess is formed in an upper half of the lens. Based on this condition, roughness due to measurement errors and the recess for attachment are distinguished to detect the position of the recess. Next, the attachment hole feeler 38 is moved in a lateral direction to measure a length Y of the recess in a direction toward the lens center. Alternatively, the value of the length Y can be inputted through an external input unit.

(III) Measurement of Curvature of Rear Refractive Surface of Lens Lm

Figure 19:
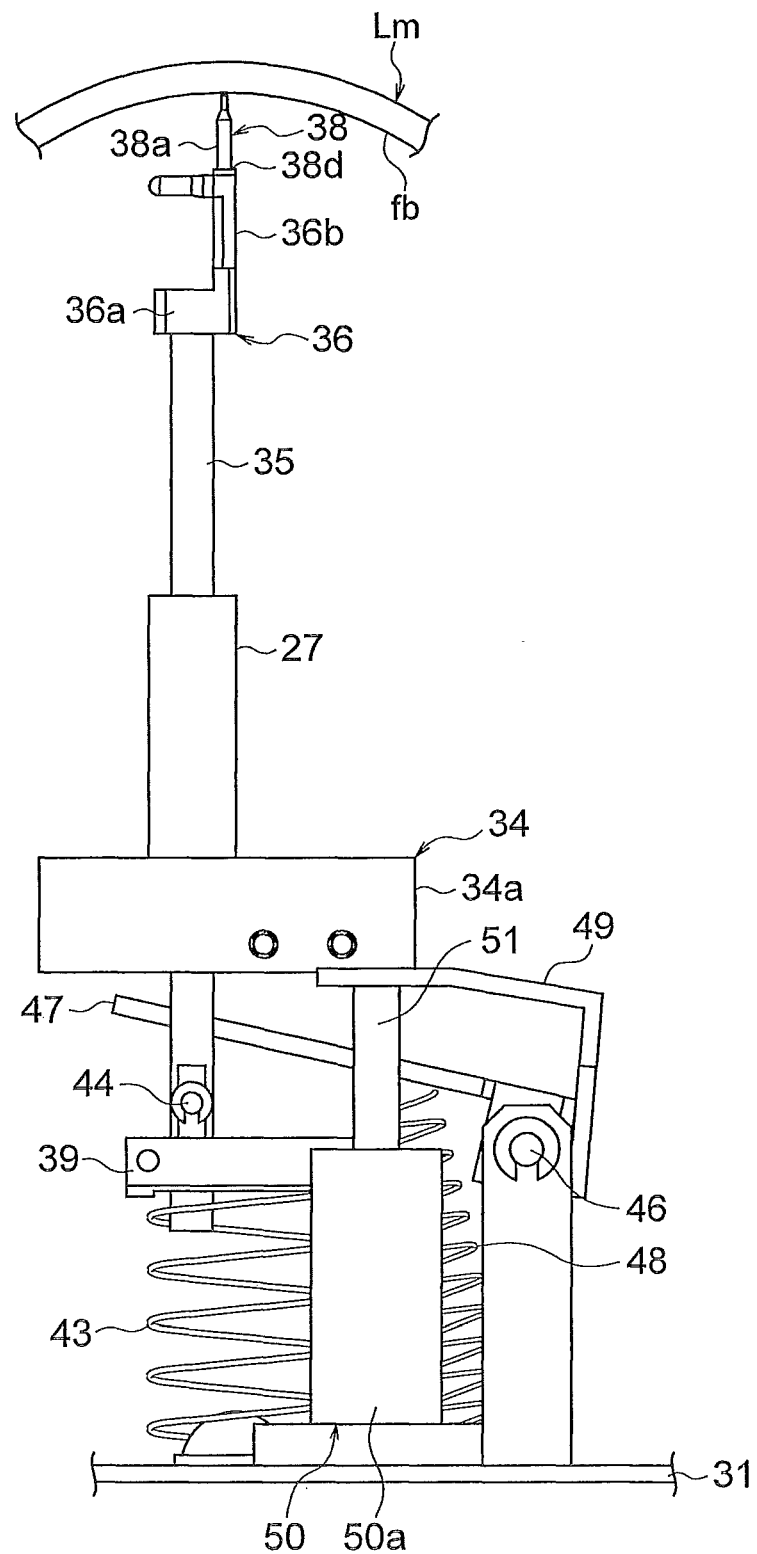
FIG. 19 is an explanatory view of the lens shape measurement by the elevating mechanism of FIG. 2.
Figure 30B:
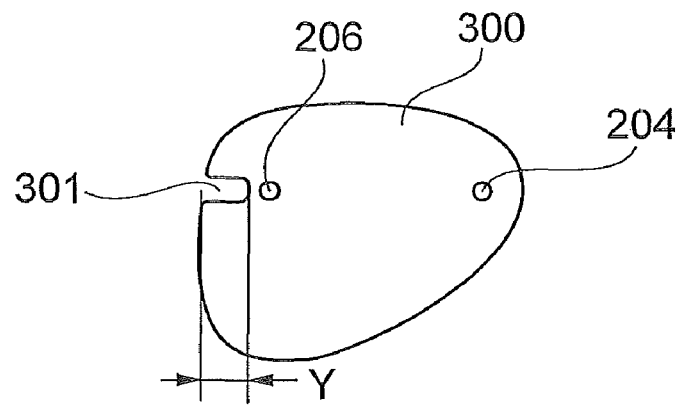
FIG. 30B is an explanatory view showing a modification.

When the rim shape measurement (outer shape measurement) of the lens Lm of the aforementioned in FIG. 30B only provides two-dimensional lens shape information ($\theta i$, $\rho i$), three-dimensional lens shape information ($\theta i$, $\rho i$, $Zi$) can be obtained by calculating by measurement the curvature of a rear refractive surface fb of the lens Lm shown in FIG. 19, and calculating the vertical position $Zi$ of the cutting surface of the lens Lm at the two-dimensional lens shape information ($\theta i$, $\rho i$) based on the calculated curvature and the lens shape information ($\theta i$, $\rho i$). From the three-dimensional lens shape information ($\theta i$, $\rho i$, $Zi$), the circumferential length of the lens Lm as a dummy lens in three-dimension can be calculated. Hereinafter, a description is given of a procedure of calculating the curvature of the rear refractive surface of the lens Lm.

[Step S1]

Figure 20:
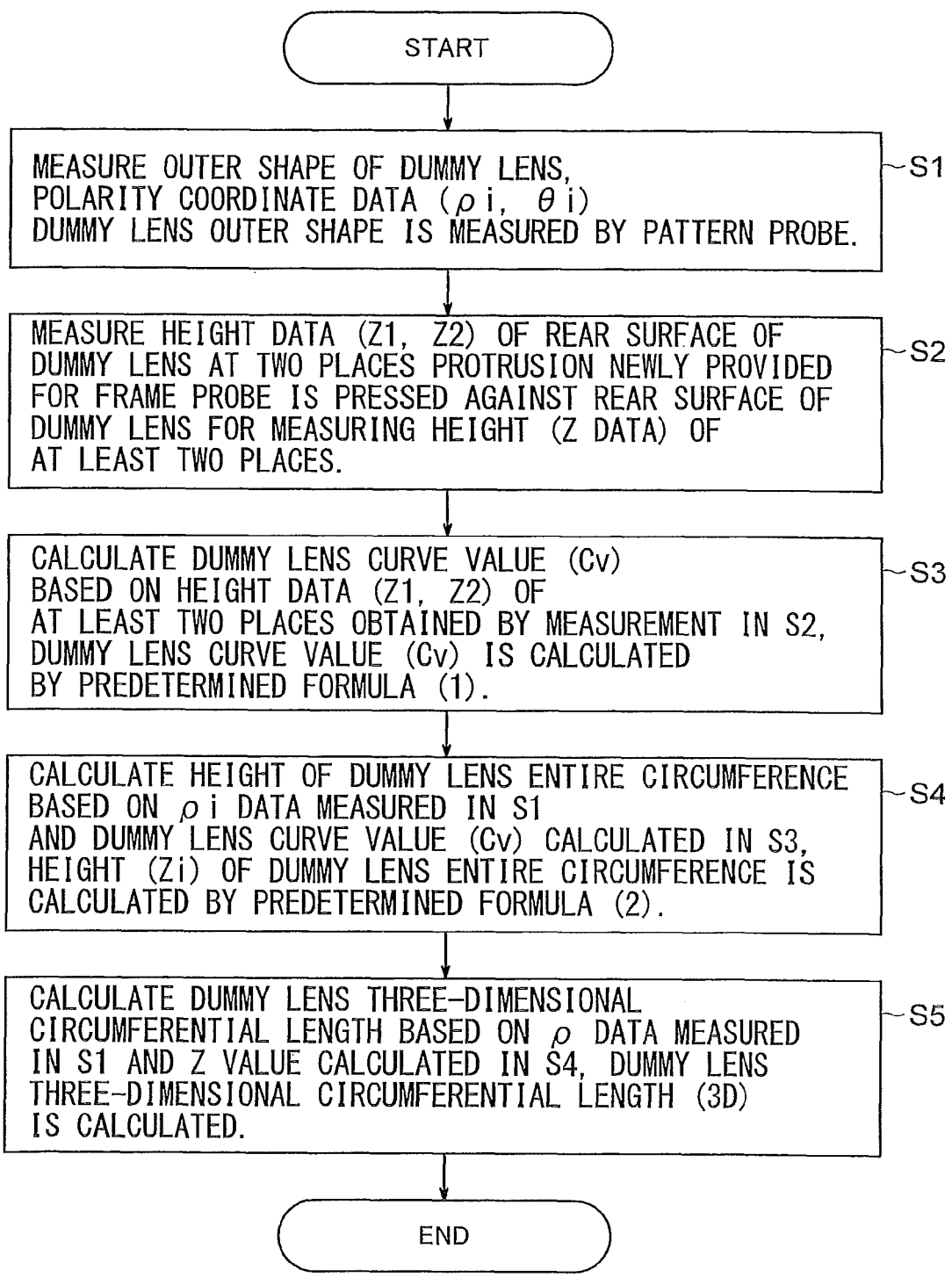
FIG. 20 is a flowchart for calculating a curvature of a refractive surface of a lens by the lens shape measuring apparatus of FIGS. 1 to 5.

As show in FIG. 20, in step S1, the two-dimensional lens shape information ($\theta i$, $\rho i$) is calculated in the rim shape measurement (outer shape measurement) of the lens Lm, and then the procedure proceeds to step S2.

[Step S2]

At step S2, the calculation control circuit 52 measures the curvature of the rear refractive surface fb of the lens Lm shown in FIG. 19. First, as described above, the calculation control circuit 52 operates and controls the actuator motor 50 in a similar way to the measurement of the lens frame in FIG. 30A to bring the upper end of the lens shape feeler 36 into contact with the rear refractive surface fb of the lens Lm held by the not-shown lens holder with the spring force of the coil spring 43.

Here, the lens Lm is held by a sucker, and the sucker is detachably attached to a not-shown lens folder, so that the lens Lm is held by the lens holder. Moreover, with the lens holder being held between the lens frames 3 and 3, the axis line of the sucker of the lens holder vertically extending (not shown) is set so as to coincide with the axis line (an axis line O in FIG. 7) of the lens shape feeler 36 vertically extending when the slider 15 is located at its origin position. The position (point) at which these axis lines coincide with each other is set to an origin P0 in the X direction (in a radial direction of the lens Lm) of the measurement.

Figure 21A:
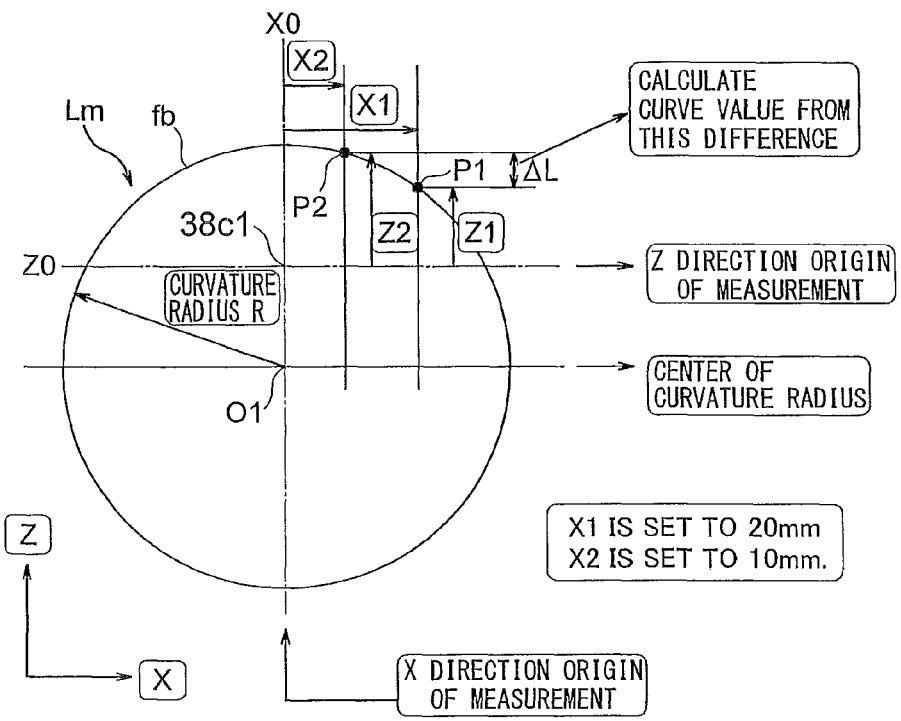
FIG. 21A is an explanatory view for calculating the curvature of the lens by measurement by the lens shape measuring apparatus of FIGS. 1 to 5.
Figure 21B:
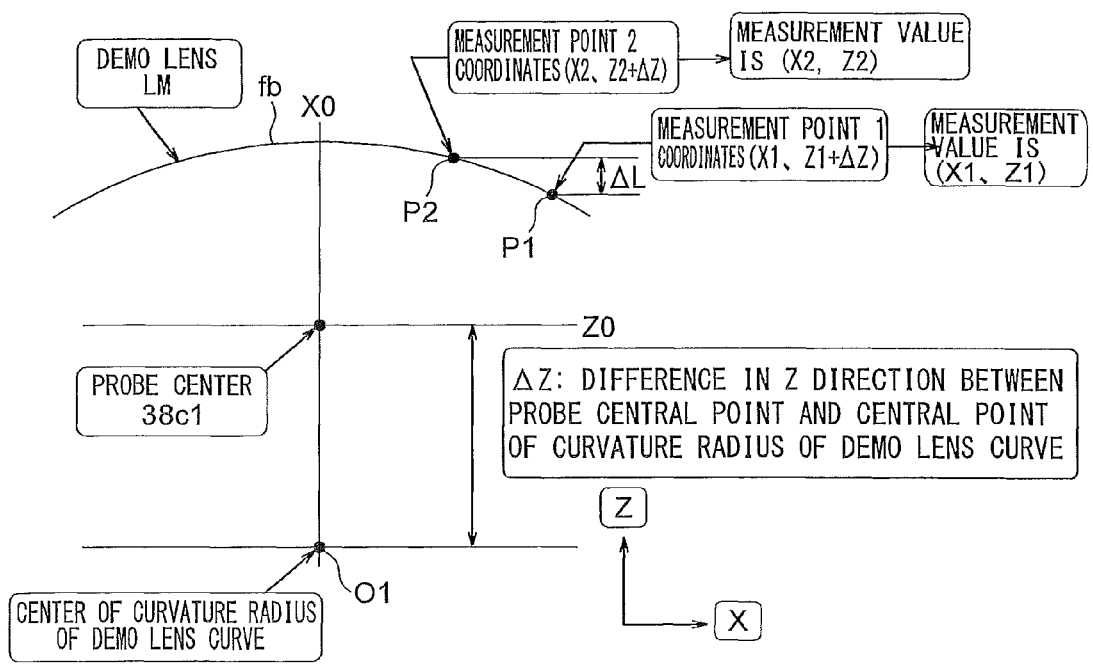
FIG. 21B is a partial enlarged view of FIG. 21A.

As shown in FIG. 7, when the feeler shaft 35 is lowered to the lowest position and the lens frame feeler 37 is located at the initial position (α), the lens shape feeler 36 is also located at the lowest initial position. The position of the upper end (top end) of the lens shape feeler 36 at this time is an initial position (γ), which is set to an origin Z0 of measurement in the Z direction (in the vertical direction) in FIGS. 21A and 21B.

In such conditions, the calculation control circuit 52 operates and controls the driving motor 18 to cause the slider 15 to move along the guiderail 14 through the wire 20 moving in cooperation with the driving motor 18, thus sequentially moving the upper end (tip end) of the lens shape feeler 36 to measurement points P2 and P1 in the radial direction (X direction) of the lens Lm. The measuring point P2 is located at a position to which the lens shape feeler 36 is moved from the origin X0 in the radial direction (the X direction) of the lens Lm in the X direction by a distance X2, and the measuring point P1 is located at a position to which the lens shape feeler 36 is moved from the origin X0 in the X direction by a distance X1 (X1>X2).

At this time, the calculation control circuit 52 respectively calculates heights Z2 and Z1 in the Z direction (in the vertical direction) at the distances X2 and X1 in the rear refractive surface fb of the lens Lm based on the movement amount detection signal from the linear scale 40 and proceeds to step S3. The heights Z2 and Z1 in the Z direction are distances from the origin Z0 in the Z direction.

(Step S3)

At step S3, the calculation control circuit 52 calculates a curve value from the curvature of the rear refractive surface fb of the lens Lm. Here, when the distance from the center O1 of curvature of the rear refractive surface fb of the lens Lm to the origin Z0 in the Z direction is ΔZ, the height from the center O1 of curvature to the measurement point P2 is Z2+ΔZ, and the height from the center O1 of curvature to the measurement point P1 is Z1+ΔZ. Accordingly, the coordinates of the measurement points P2 and P1 are (X2, Z2+ΔZ) and (X1, Z1+ΔZ), respectively.

To calculate the curvature from such coordinates (X2, Z2+ΔZ) and (X1, Z1+ΔZ) of the measurement points P2 and P1, the calculation control circuit 52 uses the circle equation, which is:

$$X^2+Z^2=R^2$$

where R is a radius of curvature of the lens Lm.

From the above equation, the equation into which the measurement point P1 is substituted is:

$$(X1)^2+(Z1+\Delta Z)^2=R^2 \quad (1).$$

The equation into which the measurement point P1 is substituted is:

$$(X2)^2+(Z2+\Delta Z)^2=R^2 \quad (2).$$

Subtracting the equation (2) from the equation (1) yields:

$$(X1)^2-(X2)^2+(Z1+\Delta Z)^2-(Z2+\Delta Z)^2=0.$$

The above equation is expanded to:

$$(X1)^2-(X2)^2+(Z1)^2+2(Z1)\cdot\Delta Z+\Delta Z^2-(Z2)^2-2(Z2)\cdot\Delta Z-\Delta Z^2=0.$$

And then, $$(X1)^2-(X2)^2+(Z1)^2+2(Z1)\cdot\Delta Z-(Z2)^2-2(Z2)\cdot\Delta Z=0.$$

The above equation is summarized for ΔZ as:

$$[2(Z1)-2(Z2)]\Delta Z=(X2)^2-(X1)^2+(Z2)^2-(Z1)^2.$$

From this equation, ΔZ can be obtained using the following equation:

$$\Delta Z = \frac{(X2)^2-(X1)^2+(Z2)^2-(Z1)^2}{2[(Z1)-(Z2)]}$$

Figure 22A:
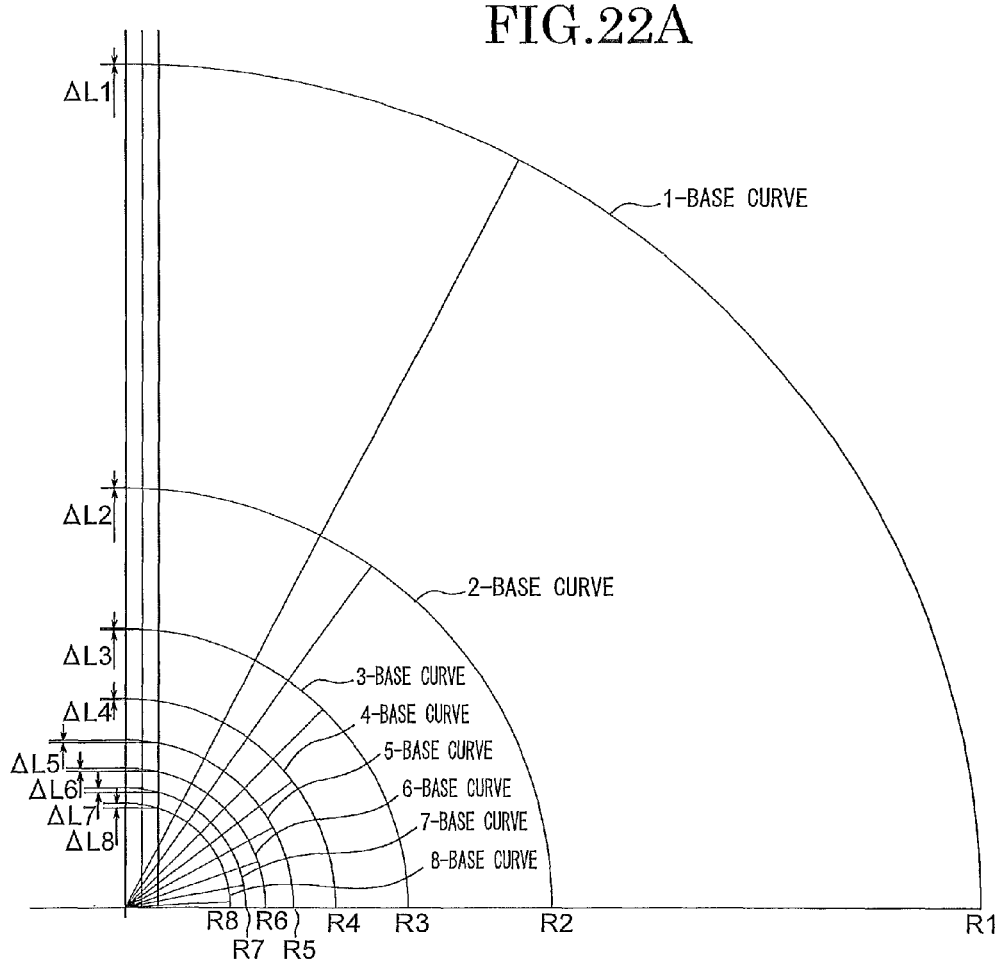
FIG. 22A is an explanatory view of a curve value of a spectacle lens.
Figure 22B:
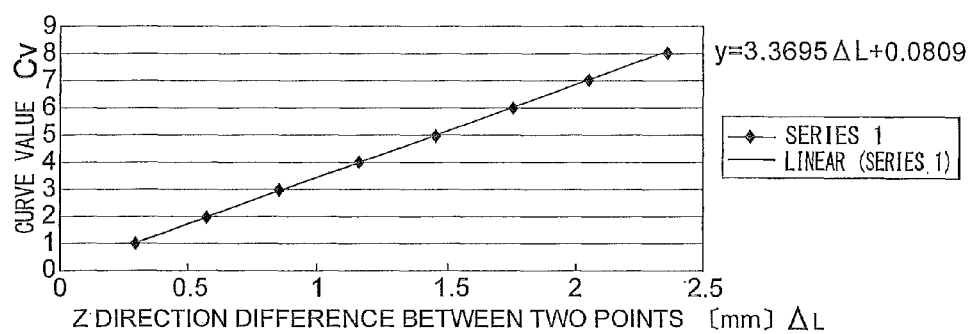
FIG. 22B is a characteristic diagram showing a relationship between the curve value of FIG. 21A and a difference between two measurement points on the refractive surface of the lens.

The curve values of spectacle lenses are set in a range of 1 to 8 curves as shown in FIGS. 22A and 22B. Radii of curvature R1 to R8 for the respective curve values of 1 to 8 curves are shown in Table 1. Here, the curve values 1 to 8 may be determined as the curve value 1 is a curvature factor when the curvature radius is R1 (=523 mm).

TABLE 1

| Curve value | Radius of curvature Ri (mm) | Difference in Z direction | Curve value obtained from approximated curve | Error from theoretical value |
|---|---|---|---|---|
| 1 | R1: 523 | ΔL1: 0.287 | 1.0479465 | 0.0479465 |
| 2 | R2: 261.5 | ΔL2: 0.575 | 2.0183625 | 0.0183625 |
| 3 | R3: 174.3333 | ΔL3: 0.854 | 2.958453 | −0.041547 |
| 4 | R4: 130.75 | ΔL4: 1.156 | 3.976042 | −0.023958 |
| 5 | R5: 104.6 | ΔL5: 1.451 | 4.9700445 | −0.0299555 |
| 6 | R6: 87.16667 | ΔL6: 1.75 | 5.977525 | −0.022475 |
| 7 | R7: 74.71429 | ΔL7: 2.054 | 7.001853 | 0.001853 |
| 8 | R8: 5.375 | ΔL8: 2.365 | 8.0497675 | 0.0497675 |

By setting X1 and X2 described above to 10 mm and 5 mm, respectively, the differences ΔL (ΔL1 to ΔL8) between the measurement points P1 and P2 in the Z direction which respectively correspond to 1 to 8 curves can be obtained as shown in Table 3. In other words, when the difference ΔL between the measurement points P1 and P2 in the Z direction (ΔL in FIG. 21) is about 0.287, which is equal to ΔL1 for example, the radius of curvature of the lens Lm as a demo lens can be determined to be 523 mm, which is R1 corresponding to 1-base curve (a curve value of 1).

The relationship between the difference between the measurement points P1 and P2 in the Z direction (ΔL in FIGS. 21A and 21B) and a curve value Cv is expressed by linear approximation. The equation thereof is:

Curve value=3.3695×(Difference ΔL in Z direction)+ 0.0809.

The curve value Cv and difference ΔL (ΔL1 to ΔL8) in the Z direction are linearly proportional to each other as shown in FIG. 22B.

The calculation control circuit 52 calculates the curve value of the rear refractive surface fb of the lens Lm in such a manner and then proceeds to step S4.

[Step S4]

In step S4, from the curve value Cv calculated based on the difference ΔL (ΔL1 to ΔL8) in the Z direction and the lens shape information (θi, ρi), the calculation control circuit 52 calculates Z-direction position information Zbi of the rim of the rear refractive surface fb of the lens Lm and then proceeds to step S5.

[Step S5]

In step S5, from the two dimensional lens shape information (θi, ρi) and the Z-direction position information Zbi of the rim of the rear refractive surface fb of the lens Lm calculated in step S4, the calculation control circuit 52 calculates the three-dimensional lens shape information (θi, ρi, Zi) and then terminates the procedure. The calculated three-dimensional lens shape information (θi, ρi, Zi) is stored in the memory 55 by the calculation control circuit 52.

(IV) Position Measurement of Attachment Hole of Lens Lm

As shown in FIG. 23B, the lens Lm (ML) includes the attachment holes 204 and 206, and the lens Lm (MR) includes the attachment holes 205 and 207.

Figure 24A:
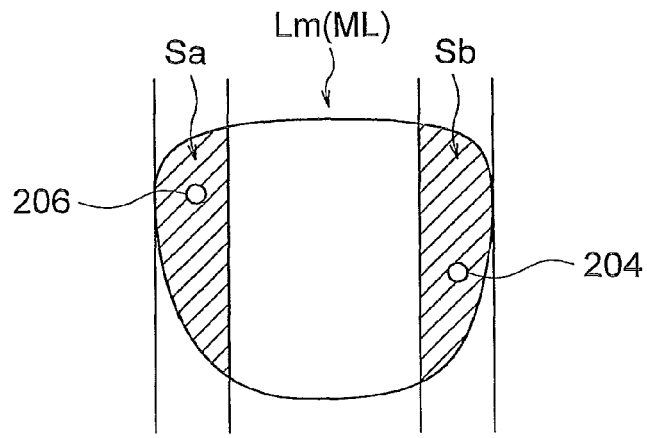
FIG. 24A is an explanatory view showing an example of a range for position detection of attachment holes of a lens.

When the lens Lm of the three-dimensional lens shape information (θi, ρi, Zi) obtained by the above measurement of (II) and (III) is the lens Lm (ML) of FIG. 23B, for example, the calculation control circuit 52 sets attachment hole detection ranges (sensing ranges) Sa and Sb based on the three-dimensional lens shape information (θi, ρi, Zi) as shown in FIG. 24A.

The attachment hole detection ranges Sa and Sb are set a predetermined range apart from the outer circumferential surface of the lens Lm based on the three-dimensional lens shape information (θi, ρi, Zi). The predetermined range is set to a predetermined amount (for example, 1 mm) inside of the outer circumferential surface of the lens Lm. This is for preventing the attachment hole feeler 38 from being separated from the lens Lm. If the attachment hole feeler 38 is separated from the lens Lm while the attachment hole feeler 38 is moved in the attachment hole detection ranges Sa and Sb for detection of the attachment holes 204 and 206, it takes a long time to return the feeler 38 to the original position. The value of 1 mm is just an example, and the present invention is limited to this. The point is that the attachment hole feeler 38 is not disengaged from the lens Lm and the attachment holes can be detected.

Figure 24B:
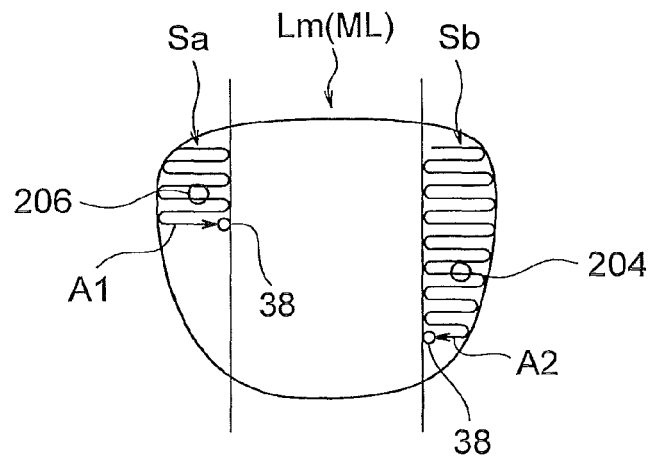
FIGS. 24B and 24C are explanatory views of an operation of position detection of attachment holes of the lens.
Figure 24C:
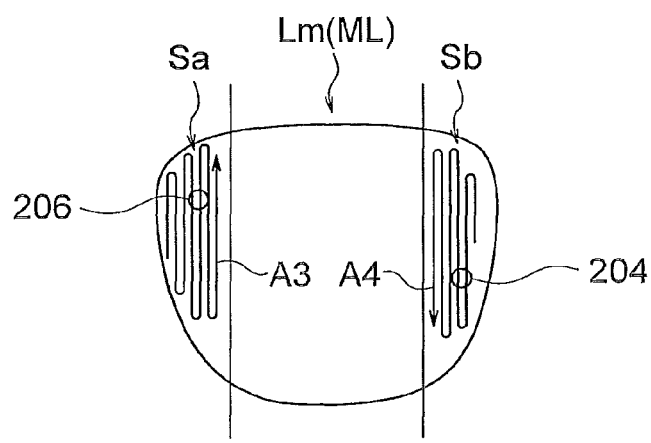

Thereafter, on the basis of the three-dimensional lens shape information (θi, ρi, Zi), the calculation control circuit 52 causes the attachment hole feeler 38 in contact with the rear refractive surface of the lens Lm as shown in FIG. 24B to scan (move) in the attachment hole detection ranges Sa and Sb in a zigzag manner as indicated by arrows A1 and A2 for sensing of the attachment holes 204 and 206. In FIG. 24B, the attachment hole feeler 38 is moved from the upper edge of the lens Lm downward in a zigzag manner. Note that, the attachment hole feeler 38 may be moved in a zigzag manner in the right and left direction of the lens Lm as indicated by arrows A3 and A4 in FIG. 24C.

Such horizontal movement of the attachment hole feeler 38 can be carried out by the calculation control circuit 52 driving and controlling the driving motor 6 and a pulse motor (not-shown) moving the not-shown entire base of FIG. 2 right and left. The horizontal movement position of the attachment hole feeler 38 is obtained as position information (θi, ρi') composed of the rotational angle θi of the rotation base 9 rotated by the driving motor 6 and the amount of right and left movement of the aforementioned pulse motor.

Moreover, the vertical movement position of the attachment hole feeler 38 is obtained as Zi' corresponding to the position information (θi, ρi') based on the detection signal from the linear scale 40. By moving the attachment hole feeler 38 in a zigzag manner as described above, the three dimensional position information of the attachment hole feeler 38 is obtained as (θi, ρi', Zi').

Figure 25A:
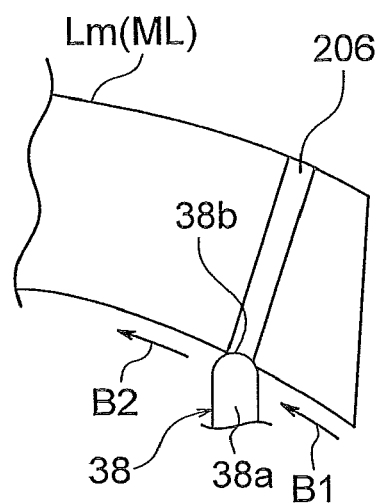
FIGS. 25A to 25C are partial cross-sectional views for explaining detection of an attachment hole provided for a lens.
Figure 25B:
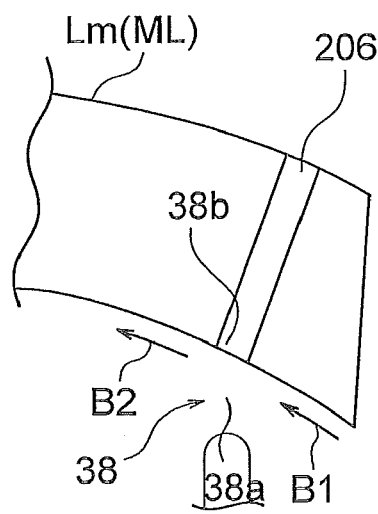
Figure 25C:
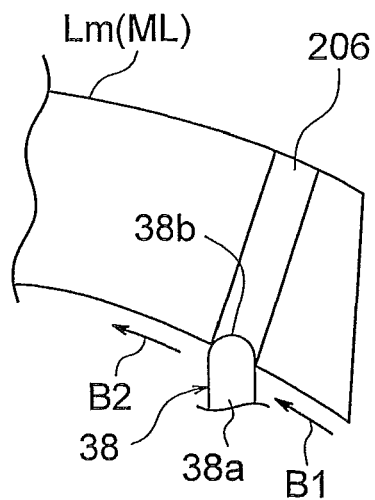

In the case where the attachment hole feeler 38 is moved in a zigzag manner as described above, when the attachment hole feeler 38 is moved in directions of arrows B1 and B2 as shown in FIG. 25A to 25C, for example, the attachment hole feeler 38 is smoothly displaced upward along the rear refractive surface of the lens Lm before and after passing the attachment hole 206.

Figure 25D:
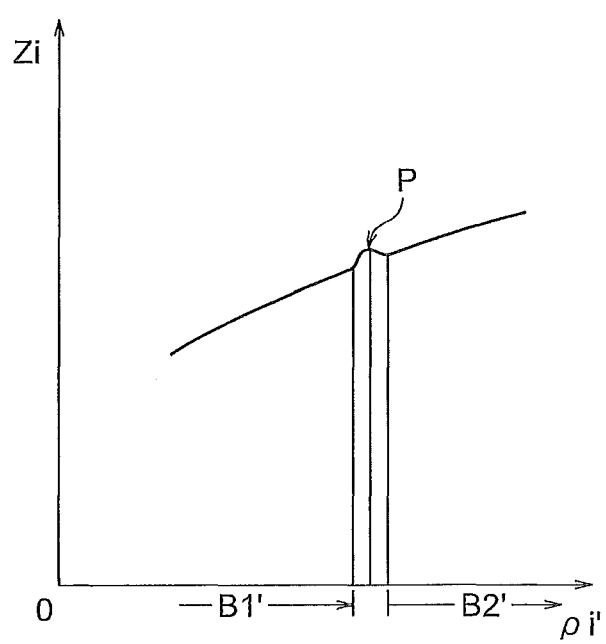
FIG. 25D is an explanatory view for explaining the detection of the attachment hole of FIGS. 25A to 25C.

The upward movement position Zi of the attachment hole feeler 38 is obtained from the detection signal of the linear scale 40 as a vertical position change curve shown in FIG. 25D. At this time, in the vertical position change curve, in a range indicated by the arrow B1 of FIG. 25A to 25C where the attachment hole feeler 38 moves toward the attachment hole 206, the movement position Zi' smoothly changes upward as indicated by B1'. In a range indicated by the arrow B2 of FIG. 25A to 25C where the attachment hole feeler 38 moves from the attachment hole 206, the movement position Zi' smoothly changes upward as indicated by B2'.

When a part of the attachment hole feeler 38 enters the attachment hole 206, as shown in the vertical position change curve of FIG. 25D, the upward displacement of the attachment hole feeler 38 greatly changes at the position indicated by P.

Accordingly, the calculation control circuit 52 stores a central position of the position P in the memory 55 as the three-dimensional position information (θi, ρi', Zi') of the attachment hole 206 to produce attachment hole processing data (drilling data).

Figure 32:
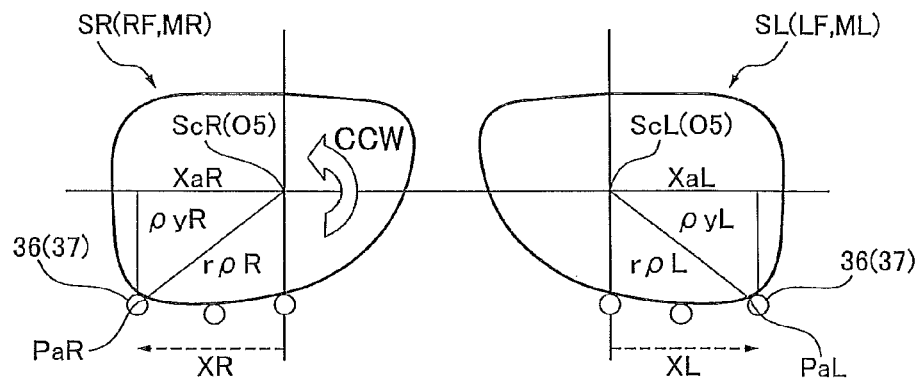
FIG. 32 is an explanatory view showing how to determine whether there is a point which is beyond the stroke of the feeler, according to the present invention.

The attachment holes 204, 205, and 207 are measured in a similar manner. (C). Measurement of Lens Shape for Lens Frame (Lens Frame Shape) Larger Than Lens Frames with Average Size and Lens Shape of Lens Such as Spectacle Lens, Dummy Lens or Template In the following description of this measurement, the lens frames LF and RF of the spectacle frame MF shown in FIG. 7 and the lenses Lm (lenses ML and MR in FIGS. 23A and 23B), such as spectacle lenses or dummy lenses, shown in FIGS. 18 and 19 are represented as lenses (lens shapes) SL and SR as shown in FIG. 32.

The feelers 36 and 37 used for measuring the lenses (lens shapes) SL and SR are rotatable by means of the driven gear 5 shown in FIGS. 2 to 5A as described above.

Specifically, the driven gear 5 in FIGS. 2 to 5A has the rotational center O5 shown in FIG. 5B. The rotation base 9 is integrally provided to the driven gear 5. The rotational center O5 of the driven gear 5 serves as the rotation axis line of the rotation base 9. The rotational center O5 extends in the vertical direction.

In addition, as described above, the horizontal movement of the slider 15 guided by the guide rail 14 causes the feeler shaft 35 and the feelers 36 and 37 to move forward and backward in the radial direction relative to the rotational center O5 shown in FIG. 5B, which is also the rotation axis lines of the driven gear 5 and the rotation base 9. Note that the amount of the forward and backward movement of the feeler shaft 35 and the feelers 36 and 37 in the radial direction varies depending on the length of the guide rail 14, the size of the slider 15, and the like. The maximum moving amount Smax of the feeler shaft 35 and the feelers 36 and 37 in the radial direction are predetermined.

(i) The necessity of extended measurement is determined by driving, in advance, the feeler independently in an X direction toward a point which is likely to be out of the moving radius of the feeler to check the radius length.

In this determination, the calculation control circuit 52 executes movement control of the feelers 36 and 37 by drive controlling drive units such as the driving motors 6 and 18, and the actuator motor 50, as in (B) Measurement on Average-sized or Ordinary Lens Shape as described above.

Specifically, the calculation control circuit 52 executes the movement control in the following manner.

The radius length rρR (or rρL) from the center of measurement ScR (or ScL) of the lens (lens shape) SR (or SL) to a point PaR (or PaL) which is likely to be beyond the stroke of the corresponding feeler 36 or 37 in measurement is checked in a way that, before the start of the ordinary lens shape measurement, the feelers 36 and 37 are independently driven for movement in the XR direction (or the XL direction) which is the X direction toward the point PaR (or PaL) by a distance XaR (or XaL) (refer to FIG. 32). Here, the center of measurement ScR (or ScL) is also the rotational center O5 of the rotation base 9.

By independently driving the feelers 36 and 37 only in the XR direction (or the XL direction) for the check, the distance from an imaginary line X passing through the rotational center O5 of the rotation base 9 to the point PaR (or PaL) is read as a measurement value ρyR (or ρyL). On the basis of the measurement value ρyR (or ρyL), the distance from the center of measurement ScR (or ScL) to the feeler 36 or 37 (pattern sensor) is converted into the radius length rρR (or rρL). The distance may be that from the center of measurement ScR (or ScL) to the center of the feeler 36 or 37 (pattern sensor).

When the feelers 36 and 37 are moved in the XR direction (or the XL direction) maximally to a point of reverse where the radius length rρR (or rρL) reaches its maximum (the maximum moving amount Smax), the radius ρi goes beyond the stroke (the maximum moving amount Smax) of the feelers 36 and 37 in measurement in the half way. This corresponds to an error, and thus it is determined to execute the extended measurement.

When no point of reverse as described above is detected during the movement of the feelers 36 and 37 in the XR (or XL) direction, the feelers 36 and 37 are maximally moved by a distance XaR (or XaL), which allows an ordinary measurement.

The movement of the feelers 36 and 37 in the XR (or XL) direction is set so that the directions of the movement for left and right lenses SR and SL, respectively, can be opposite to each other (refer to FIG. 32). In this case, the measurement rotation direction of the feelers 36 and 37 centered at the rotational center O5 is not limited to the clockwise direction (CW) only or the counterclockwise direction (CCW) only. The direction may be the clockwise direction (CW) or the counterclockwise direction (CCW).

After completion of such search, the feelers 36 and 37 are returned to a starting point of measurement.

If the radius rρR (or rρL) is beyond the stroke of the feeler in measurement, the procedure proceeds to the extended measurement sequence.

If the radius rρR (or rρL) is within the stroke of the feeler in measurement, the ordinary measurement is continued.

Here, for the lens SR, $$r\rho R = \sqrt{(\rho yR)^2 + (XaR)^2}$$

where
a distance moved from the center of measurement is XaR,
a value read from an SLIDC (the linear scale 24) is ρyR,
and
the distance from the center of measurement to the center of the pattern sensor is rρR.

Meanwhile, for the lens SL, $$r\rho L = \sqrt{(\rho yL)^2 + (XaL)^2}$$

where
a distance moved from the center of measurement is XaL,
a value read from the SLIDC (the linear scale 24) is ρyL,
and
the distance from the center of measurement to the center of the pattern sensor is rρL.

When a shorter measurement time is required, such processes for determining and setting a measurement region can be omitted.

(ii) The necessity of the extended measurement is determined by detecting the excess of the moving radius limit (measurement limit) value for the feeler during an ordinary measurement.

Judgment whether to divide the measurement region into multiple pieces or a plurality of sub-regions may be made on the basis of measurement on the lens SL (or SR), in stead of the measurement of the point as in item (i). These measurement and determination (judgment) are made first on the right lens SR.

Step S10

Figure 33:
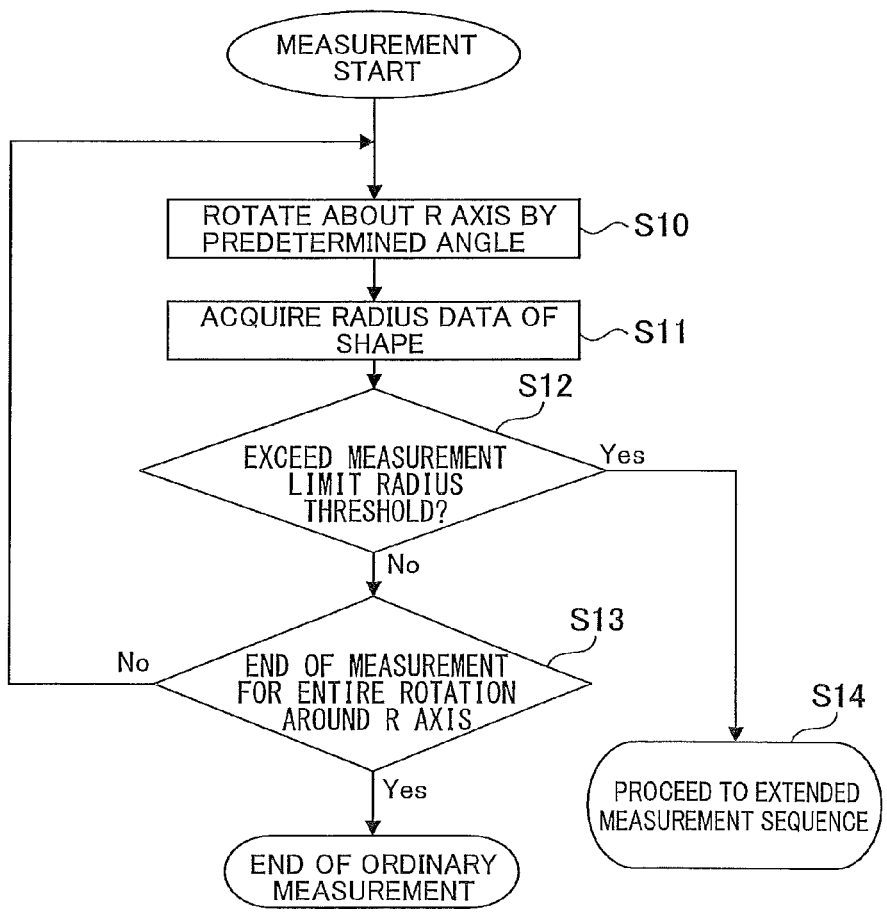
FIG. 33 is a flow chart for determining whether there is a point which is beyond the stroke of the feeler, according to the present invention.

Specifically, in Step S10 of FIG. 33, the calculation control circuit 52 places the rotational center O5 of the feelers 36 and 37 at the initial position for the measurement by drive controlling the driving motor 6, the driving motor 18, the actuator motor 50, and the like as described above. Thereafter, the calculation control circuit 52 rotates the rotation base 9 about the rotational center (vertical axis line) O5 in a horizontal direction by drive controlling the driving motor 6 so as to start the measurement of the lens shape of the lens (lens shape) SR using the feelers 36 and 37. Then, the procedure proceeds to Step S11.

Step S11

In this Step S11, the calculation control circuit 52 starts to acquire lens shape data (θi, ρi) by measuring radii ρi (i=0, 1, 2, ... n) with respect to the rotation angles (angles) θi (i=0, 1, 2, ... n) of the rotation base 9 about the rotational center (vertical axis line) O5 by using the linear scale 24.

In this step, for measurement of the lens shape for the lens frame RF, which corresponds to the spectacle lens shape SR, the lens frame feeler 37 is brought into contact with the inner peripheral surface of the lens frame RF, which corresponds the spectacle lens shape SR. With this contact state being kept, the lens frame feeler 37 is moved in the circumferential direction of the lens frame RF along the inner peripheral surface (contact surface with the lens) of the lens frame RF, to thereby start the measurement of the lens shape represented by radii µi (i=0, 1, 2, ... n) with respect to rotation angles θi. Here, the radii ρi (i=0, 1, 2, ... n) represent change in distance from the geometric center of the lens frame shape (lens shape) of the lens frame RF, which corresponds to the lens shape, to the lens frame feeler 37.

Meanwhile, in this step, for measurement of a lens shape of the lens Lm (the lens MR in FIGS. 23A and 23B) such as a spectacle lens, a dummy lens, or a template, corresponding to the spectacle lens SR, the lens shape feeler 36 is brought into contact with the outer peripheral surface of the lens Lm (the lens MR in FIGS. 23A and 23B). With this contact state being kept, the lens shape feeler 36 is moved in the circumferential direction of the lens Lm (the lens MR in FIGS. 23A and 23B) along the outer peripheral surface (contact surface with the lens) of the lens Lm, to thereby start the measurement of a lens shape (lens) represented by radii ρi with respect to the rotation angles θi. Here, the radii ρi (i=0, 1, 2, . . . n) represent change in distance from the geometric center of the lens shape of the lens Lm (the lens MR in FIGS. 23A and 23B) to the lens shape feeler 36.

As described above, the calculation control circuit 52 starts to acquire lens shape data (θi, ρi) of the lens SR, and proceeds to Step S12.

Step S12

Then, on the basis of the lens shape data (θi, ρi) acquired in Step S11, the calculation control circuit 52 determines whether the entire circumferential measurement region of the lens (lens shape) SR has a point where the radius ρi exceeds the maximum moving amount Smax of the corresponding feeler 36 or 37 in the radial direction (i.e., the point is beyond the stroke of the feeler). In this determination, if the radius ρi does not exceed the maximum moving amount Smax of the corresponding feeler 36 or 37 in the radial direction (i.e., the radius ρi is within the reach of the feeler), the calculation control circuit 52 proceeds to Step S13. In this determination, if the radius ρi exceeds the maximum moving amount Smax of the corresponding feeler 36 or 37 in the radial direction (i.e., the radius ρi is beyond the stroke of the feeler), the calculation control circuit 52 proceeds to Step S14.

Step S13

In this Step S13, the calculation control circuit 52 judges whether or not the acquired lens shape data (θi, ρi) of the lens SR covers the entire circumference of the lens SR.

If the acquired lens shape data (θi, ρi) of the lens SR does not cover the entire circumference of the lens SR, the calculation control circuit 52 returns to Step S10 and repeats the processing.

If the lens shape data (θi, ρi) of the lens SR acquired in Step S13 covers the entire circumference of the lens SR, the calculation control circuit 52 terminates the ordinary measurement.

(III). As a result of the necessity determination of the extended measurement in item (i) or (ii) as described above, if it is determined that the extended measurement is necessary, the calculation control circuit 52 executes the extended measurement sequence shown in FIG. 34.

Step S14

Then, on the basis of this measurement, if determining that there is a measurement point where the radius ρi exceeds the maximum moving amount Smax of the corresponding feeler 36 or 37 in the radial direction (i.e., the radius ρi is beyond the stroke of the feeler), the calculation control circuit 52 divides the measurement region into a first region (first measurement region) and a second region (second measurement region). In the first region, the radii ρi do not exceed the maximum moving amount Smax of the corresponding feeler 36 or 37 in the radial direction. In the second region, the radii ρi exceed the maximum moving amount Smax of the corresponding feeler 36 or 37 (i.e., the radius ρi is out of the moving radius of the feeler).

Thereafter, in the first region, while the rotation axis line (rotational center O5) is positioned at the initial measurement position, which is a first position, the radii ρi are measured. Meanwhile, in the second region, the rotation axis line (rotational center O5) is moved from the initial measurement position to a second position which allows measurement within the maximum moving amount Smax by the corresponding feeler 36 or 37, and then the radii ρi of the lens are measured.

The calculation control circuit 52 executes such determination whether to divide the entire circumferential measurement region of the lens into the first and second regions, and determination of and control for measurement of the lens in the first and second regions.

Figure 34:
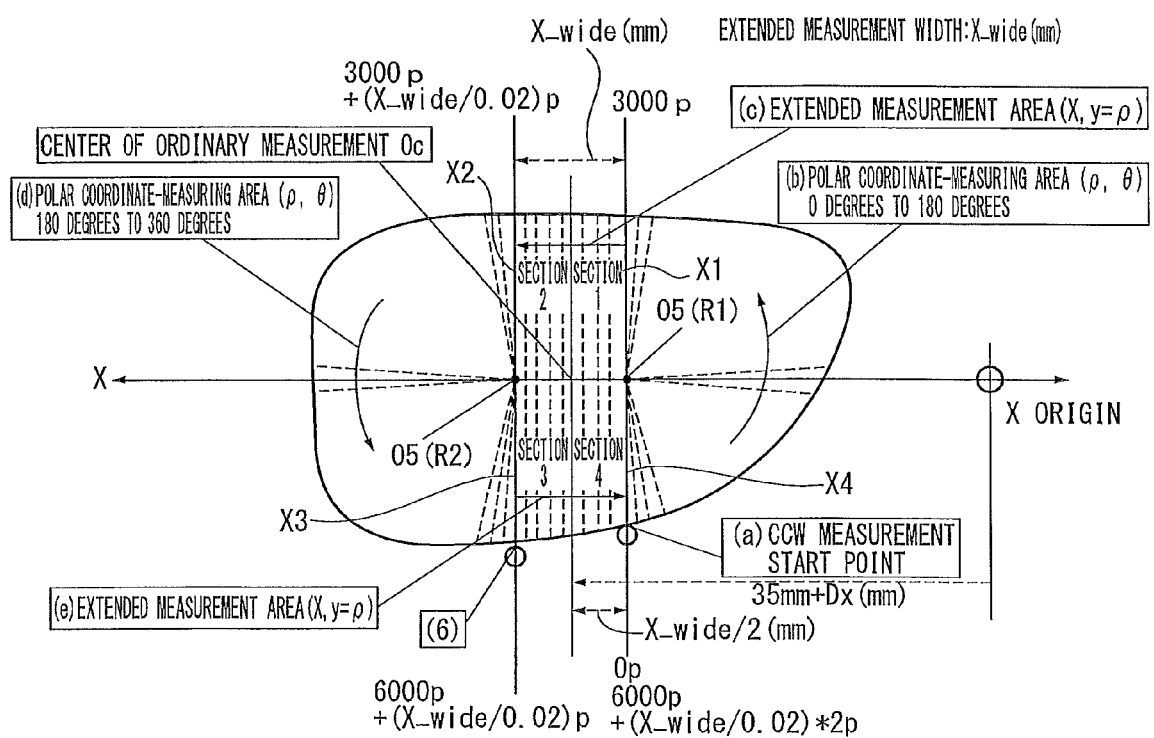
FIG. 34 is an explanatory view of a measurement region in a case where the determination in FIG. 33 indicates that there is a point which is beyond the stroke of the feeler.

Specifically, the lens shape is measured, while the measurement regions are set as shown in FIG. 34. Sections X1, X2, X3, and X4 (extended measurement area) where the feeler is driven only in the X direction for measurement as shown in FIG. 34 are interposed, in order to compensate the shortage of the measurement reach of the prove in the A size direction (X direction) of the lens SR. FIG. 34 shows a case where the measurement is performed in counter clockwise (CCW) direction.

(a). The rotational center O5 is moved in the X axis direction from the center of an ordinary measurement Oc to the position (−X_wide/2), i.e., (R1) which is closer to the X origin in FIG. 34 than the center of an ordinary measurement Oc by a half of an extended measurement width X_wide.

(b). With the rotational center O5 being at the position of (−X_wide/2) i.e., (R1), the rotation base 9 is rotated about the rotational center O5, and the lens SR is measured by using the corresponding feeler 36 or 37 in the polar coordinate system within the range of 180 degrees.

(c). For the sections X1 and X2 (extended measurement area), axial rotation of the rotation base 9 about the rotational center O5 is stopped, and the upper side of the lens SR within the range of the extended measurement width (X_wide) is measured by using the feeler 36 or 37.

The slider 15 is moved by an X motor (the driving motor 18) at intervals of 0.02 mm, which is the minimum interval, to thereby measure radii (radius data) of the lens SR within the sections X1 and X2 (on the upper side of the lens SR) by using the feeler 36 or 37.

(d). The rotational center O5 is moved in the X axis direction from the center of the ordinary measurement Oc to the position (−X_wide/2), i.e., (R2) which is more distant from the X origin in FIG. 34 than the center of an ordinary measurement Oc by a half of an extended measurement width X_wide. With the rotational center O5 being at the position of (−X_wide/2), the rotation base 9 is rotated about the rotational center O5, and the lens SR is measured by using the feeler 36 or 37 in the polar coordinate system within the range of the other 180 degrees.

(e). For the sections X3 and X4 (extended measurement area), the axial rotation of the rotation base 9 about the rotational center O5 is stopped, and the lower side of the lens SR within the range of the extended measurement width (X_wide) is measured by using the feeler 36 or 37.

[Processing of Radii (Radius Data) Acquired in Extended Measurement]

The calculation control circuit 52 executes the processing of the radii (radius data) thus acquired in items (a) to (e) in accordance with the following procedure.

Here,

X axis extended measurement width: x_wide [mm]

X motor linearity: x_mtr_linia [ratio]

difference in axis between the polar coordinate system and the absolute coordinate system: X_mtr_axis [degrees]

(1-1). The acquired row radius data (ρ data) is converted into data centered at a pattern stylus center position.

$$\rho => \rho strs$$

(1-2). the ρ data obtained by the polar coordinate measurement is converted into the X, Y coordinates.

$$(\rho strs, \theta) => (x, y)$$

(1-3). the XY coordinates converted from the ρ data obtained by the polar coordinate measurement are converted into data centered at the center of the ordinary measurement.

x coordinate correction amount:

$$\Delta x = x\_wide/2*1000*x\_mtr\_linia$$

y coordinate correction amount:

$$\Delta y = \tan(X\_mtr\_axis)*\Delta X$$

[For CCW Measurement]
0 to 180 degrees (x', y')=(x+Δx, y+Δy)
180 to 360 degrees (x', y')=(x−Δx, y−Δy)

(1-4). The radius data obtained by the extended area measurement is converted into data centered at the center of the ordinary measurement.

$$(X, \rho strs) => (x', y')$$

[For CCW Measurement]

The extended measurement area is divided into sections.

<Section 1>

$$3000 \, p \text{ to } 3000 \, p + \{(x\_wide/0.02)*(1/2)\}$$

x coordinate: x'=(x_wide·0.02*j)*1000*x_mtr_linia
y coordinate: y'=ρstrs+tan(x_mtr_axis)*x'

<Section 2>

$$3000 \, p + \{(x\_wide/0.02)*(1/2)\} \text{ to } 3000 \, p + (x\_wide/0.02)\}$$

x coordinate: x'=−0.02*j*1000*x_mtr_linia
y coordinate: y'=ρstrs+tan(x_mtr_axis)*x'

<Section 3>

$$6000 \, p + (x\_wide/0.02) \text{ to } 6000 \, p + \{(x\_wide/0.02)*(3/2)\}$$

x coordinate: x'=−(x_wide−0.02*j)*1000*x_mtr_linia
y coordinate: y'=−ρstrs+tan(x_mtr_axis)*x'

<Section 4>

$$6000 \, p + \{(x\_wide/0.02)*(3/2)\} \text{ to } 6000 \, p + \{(x\_wide/0.02)*2\}$$

x coordinate: x'=0.02*j*1000*x_mtr_linia
y coordinate: y'=−ρstrs+tan(x_mtr_axis)*x'

(1-5). The number of measurement points which is larger than those for the ordinary measurement because of the extended measurement is converted to the number 6000 which is the number of points of the ordinary measurement.

(1-6). Calculation processing after the conversion to the ordinary point number 6000 is the same as in the ordinary measurement.

(D). Others (Modification 1)

In the aforementioned embodiment, as shown in FIG. 23B, the bridge 201 includes the fixing plates 201c and 201d which abut on the rear refractive surfaces of the lenses Lm (ML) and Lm (MR), respectively; and the temple clasps 202 and 203 include the fixing plates 202b and 203b which respectively abut on the rear refractive surfaces of the lenses Lm(ML) and Lm(MR) as shown in FIG. 23B. However, the present invention is not necessarily limited to this.

Figure 26A:
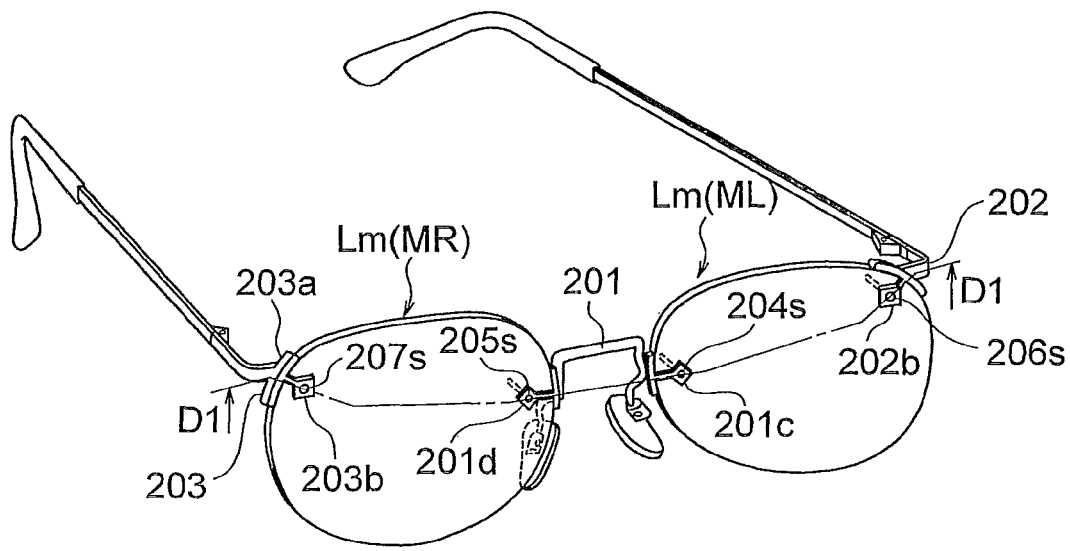
FIG. 26A is a perspective view showing another example of the two-point frame spectacles.
Figure 26B:
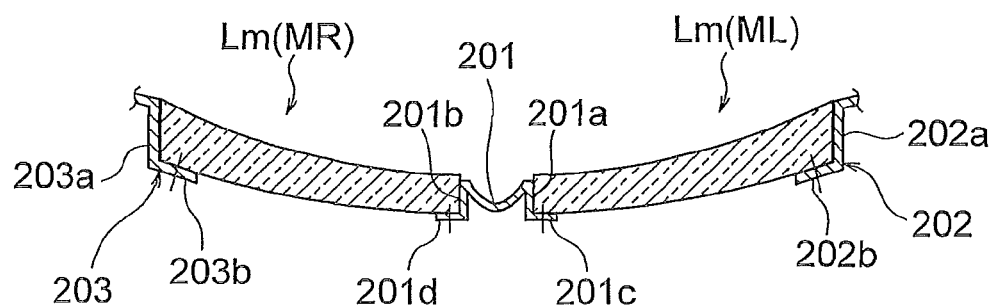
FIG. 26B is a cross-sectional view taken along a line D1-D1 of FIG. 26A.

For example, as shown in FIGS. 26A and 26B, the spectacle frame may have a configuration in which the fixing plates 201c and 201d respectively abut on front refractive surfaces of the lenses Lm (ML) and Lm (MR) and the temple clasps 202 and 203 include the fixing plates 202b ad 203b abutting on the front refractive surfaces of the lenses Lm (ML) and Lm (MR), respectively as shown in FIG. 26B.

In this case, the curvature of the front refractive surfaces of the lenses Lm (ML) and Lm (MR) and the circumferential length of the cutting surfaces of the lenses Lm (ML) and Lm (MR) are measured in a similar manner to the rear refractive surfaces of the aforementioned lenses Lm, and the positions of the attachment holes 204 to 207 are measured.

Note that, in FIGS. 26A and 26B, the same or similar components to those of FIGS. 23A and 23B are given the same reference numbers used in FIGS. 23A and 23B, and the description thereof is omitted.

(Modification 2)

Figure 27:
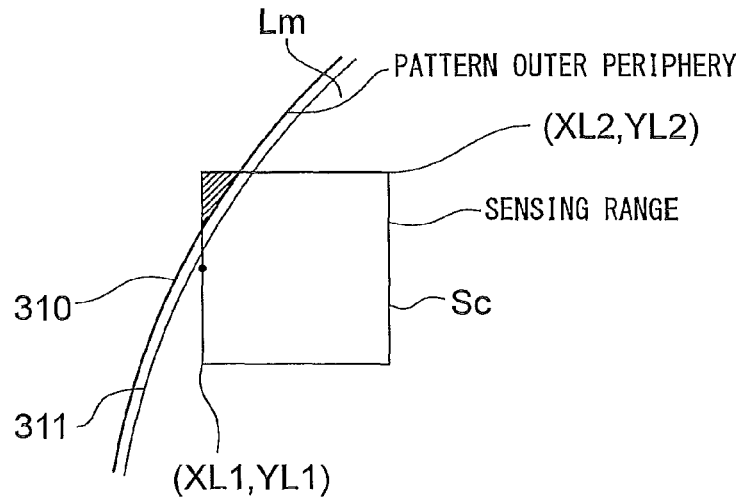
FIG. 27 is an explanatory view showing another example of the range for position detection of an attachment hole of a lens.

In the aforementioned embodiment, the attachment hole detection ranges (sensing ranges) Sa and Sb extending in the vertical direction of the lens Lm are set in the right and left parts of the lens Lm, but the present invention is not necessarily limited to this. For example, as shown in FIG. 27, a margin line 311 for measurement for preventing the attachment hole feeler from being separated from the lens is set a predetermined amount (for example, 1 mm) inside of an outer circumferential surface 310 of the lens Lm based on the lens shape information (θi, ρi, Zbi), and an attachment hole detection range (a sensing range) Sc of a predetermined range (for example, 10 mm×10 mm) is set.

Figure 28:
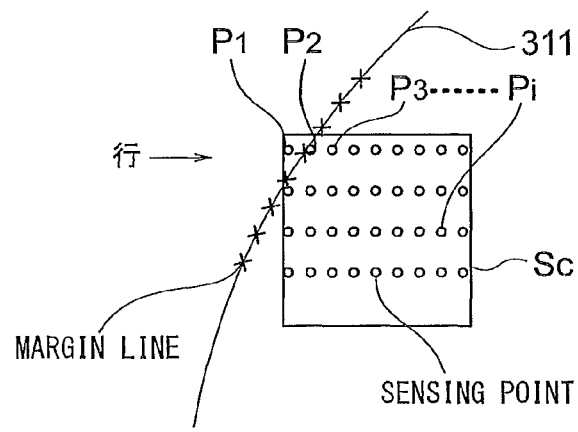
FIG. 28 is an explanatory view showing examples of positions where the position detection is carried out in the range for position detection of attachment holes of lenses.

Then, as shown in FIG. 28, a number of measurement points Pi (for example, 200 points in a matrix) are provided in the attachment hole detection range (sensing range) Sc, and three dimensional position information of the refractive surface of the lens Lm is measured at the 200 measurement points Pi in a matrix by the attachment hole feeler 38. At this measurement, the position where the attachment hole feeler 38 is largely displaced upward in the attachment hole detection range (sensing range) Sc is detected from the detection signal from the linear sensor 40 as the position of an attachment hole. The detected position is stored in the memory 55 as the three-dimensional position information (θi, ρi', Zi') to produce the attachment hole processing data (drilling data).

Typically, the positions in the lens Lm where the attachment holes 204 to 207 and the like are provided are in upper right or left side of the lens Lm or at a central portion of the right or left side of the lens Lm in the vertical direction. Accordingly, a switch for selecting a detection position such as upper part or central part in the height direction of the right and left sides of the lens Lm is provided, and based on the detection position selected by the switch and the lens shape information (θi, ρi, Zbi), the attachment hole detection range (sensing range) Sc is set.

(Modification 3)

Figure 29:
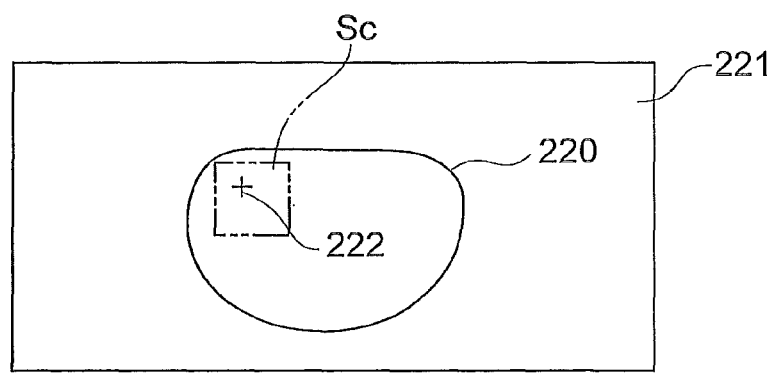
FIG. 29 is an explanatory view of a liquid crystal display used for setting the range for position detection of attachment holes of lenses.

Moreover, as shown in FIG. 29, a shape 220 of the lens Lm is displayed based on the lens shape information (θi, ρi, Zbi) on a touch screen liquid crystal display 221, and a position indicated by a cross mark 222 is indicated through a touch screen of the liquid crystal display 221, for example, as a rough position of the attachment holes 204 to 206 or the like. The aforementioned attachment hole detection range (sensing range) Sc can be set based on the indicated position.

As described above, the lens shape measuring apparatus of this embodiment of the present invention includes: a lens holding unit (not shown) provided within the measuring apparatus body 1; a lens shape feeler 36 measuring the rim shape of the lens Lm held by the lens holding unit (not shown); a feeler moving unit (driving motor 6) moving the lens shape feeler 36 along the outer circumferential surface of the lens Lm; a first position detector (linear scale 24) detecting the position of the lens shape feeler 36 along the outer circumferential surface; a second position detector (linear scale 40) detecting the position of the lens shape feeler 36 in a direction perpendicular to the first detector (linear scale 24); and a calculation control circuit 52 calculating the circumferential surface shape data of the lens Lm as the three dimensional information on the basis of the detection signals from the first and second position detectors (linear scales 24 and 40). Moreover, using (controlling) the feeler moving unit (driving motor 6), the tip end of the lens-shape feeler 36 is moved while abutting on the refractive surface of the lens Lm held by the lens holding unit (not shown). Thereby, a change due to engagement of the lens-shape feeler 36 with the attachment holes (204 to 207) of the lens Lm is detected from the detection signal of the second position detector (linear scale 40). Based on the change, the relationship between the lens rim shape and the hole position is detected.

According to such a configuration, it is possible to easily and accurately measure the positions of attachment holes through which clasps of a two-point frame are attached to lenses.

Moreover, the lens shape measuring apparatus of this embodiment of the present invention is configured to detect a position of a recess of a lens including a clasp attachment hole and including a recess in the rim from the circumferential shape of the lens.

According to this configuration, it is possible to provide a recess in the periphery of the lens and attach the clasp of the two-point frame using the recess.

Furthermore, the feeler of the lens shape measuring apparatus of this embodiment of the present invention which detects a clasp attachment hole of the lens may be composed of a different member from the feeler measuring the circumferential shape.

According to this configuration, the feeler detecting a clasp attachment hole of a lens (attachment hole feeler 38) and the lens shape feeler 36 can be easily processed.

(Modification 4)

Figure 31A:
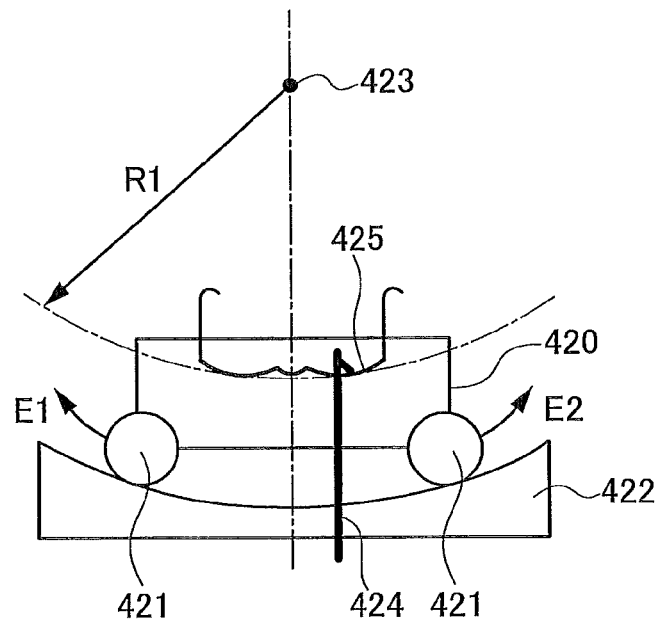
FIG. 31A is a view showing a state where a flame holding section including multiple skids is swung by the skids rolling on a guide rail in a case of the guiderail with a concaved upper surface.
Figure 31B:
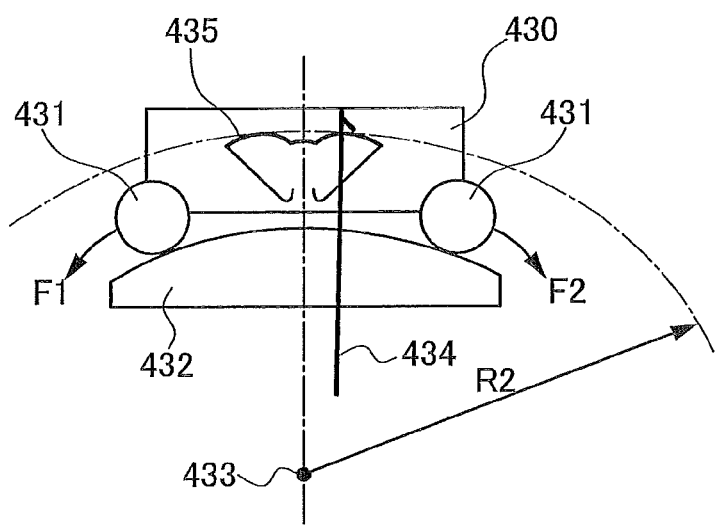
FIG. 31B is a view showing a state where a flame holding section including multiple skids is swung by the skids rolling on a guide rail in a case of the guiderail with a convex upper surface.

In FIGS. 31A and 31B, a flame holding section includes multiple skids, and the skids are rolled on a guiderail to swing the frame holding section.

In FIG. 31A, multiple skids 421 are provided for a frame holding section 420 and are configured to roll right and left on a guiderail 422 having a concaved upper surface. The upper surface of the guiderail 422 is formed in an inverted cylindrical shape, thus allowing the frame holding section 420 to swing in directions of arrows E1 and E2 around a virtual axis 423 which is located away from the measuring apparatus body (above the measuring apparatus body).

Here, reference numeral 424 denotes a feeler measuring the shape of a spectacle frame 425. The spectacle frame 425 is set within the frame holding section 420 and held at a distance R1 from the virtual axis 423.

In FIG. 31B, multiple skids 431 are provided for a frame holding section 430 and are configured to roll right and left on a guiderail 432 having a convex upper surface. The upper surface of the guiderail 432 is formed in a cylindrical shape, thus allowing the frame holding section 430 to swing in directions of arrows F1 and F2 around a virtual axis 433 which is located away from the measuring apparatus body (below the measuring apparatus body).

Here, reference numeral 434 denotes a feeler measuring the shape of a spectacle frame 435. The spectacle frame 435 is set within the frame holding section 430 and held at a distance R2 from the virtual axis 433.

According to a lens shape measuring method and a lens shape measuring apparatus of an embodiment of the present invention, it can be achieved to provide a lens shape measuring method and a lens shape measuring apparatus capable of measuring a large lens shape without enlargement in size of the apparatus as a whole.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens shape measuring method comprising the steps of:
bringing a feeler into contact with one of an inner peripheral surface of a lens frame and an outer peripheral surface of a spectacle lens or a template, each of the inner peripheral surface and the outer peripheral surface corresponding to a lens shape of spectacles, the feeler being rotatable about a rotation axis and movable forward and backward relative to the rotation axis in a radial direction; and
while keeping the contact state, moving the feeler along a contact surface of the feeler with the lens shape in a circumferential direction, to thereby measure radii $\rho i$ (i=0, 1, 2, ... n) of the lens shape over an entire circumference of the lens shape, the radii $\rho i$ representing change in distance from a geometric center of the lens shape to the feeler, wherein
a measurement region of the lens shape measured by the feeler is divided into a plurality of sub-regions, and
within each of the sub-regions, the rotation axis line is moved to a position with which the feeler is capable of measuring the lens shape to thereby cause the feeler to measure the lens shape within the sub-region.

2. The lens shape measuring method according to claim 1, wherein
the plurality of sub-regions are defined by using points where the feeler gets out of contact or stops moving as boundaries, the points being on a circumference of the spectacle lens frame or the template,
the feeler is moved for each of the sub-regions, and
the lens shape is measured by using the boundaries as measurement start points.

3. The lens shape measuring method according to claim 2, wherein
the lens shape is divided into a first region and a second region, the first region being a region within which the radii $\rho i$ do not exceed a maximum moving amount Smax of the feeler in the radial direction in a measurement of the lens shape with the rotation axis line of the feeler positioned at an initial measurement position, the second region being a region within which the radii $\rho i$ exceed the maximum moving amount Smax of the feeler in the measurement of the lens shape with the rotation axis line of the feeler positioned at the initial measurement position,
in the first region, the radii $\rho i$ are measured with the rotation axis line positioned at a first position, which is the initial measurement position, and in the second region, the rotation axis line is moved from the initial measurement position to a second position, with which the feeler does not exceed the maximum moving amount Smax, and the radii ρi of the lens shape are measured.

4. The lens shape measuring method according to claim 3, wherein in the first region, angles θi from a measurement start position of the lens shape and the radii ρi of the lens shape for the angles θi are measured, and in the second region, only the radii ρi of the lens shape are measured.

5. A lens shape measuring apparatus comprising:

a feeler rotatable about a rotation axis line, movable forward and backward relative to the rotation axis line in a radial direction and capable of coming into contact with any one of an inner peripheral surface of a lens frame and an outer peripheral surface of a spectacle lens or a template, each of the inner peripheral surface and the outer peripheral surface corresponding to a lens shape of spectacles;

a driving unit configured to move the feeler along a contact surface of the feeler with the lens shape in a circumferential direction, with the contact state being kept; and a calculation control circuit configured to measure radii ρi (i=0, 1, 2, . . . n) of the lens shape over an entire circumference of the lens shape, the radii ρi representing change in distance from a geometric center of the lens shape to the feeler, wherein the calculation control circuit divides a measurement region of the lens shape measured by the feeler into a plurality of sub-regions, and moves, within each of the sub-regions, the rotation axis line to a position with which the feeler is capable of measuring the lens shape to thereby cause the feeler to measure the lens shape within the sub-region.

6. The lens shape measuring apparatus according to claim 5, wherein the calculation control circuit defines the plurality of sub-regions by using points where the feeler gets out of contact or stops moving as boundaries, the points being on a circumference of the spectacle lens frame or the template, moves the feeler for each of the sub-regions, and measures the lens shape by using the boundaries as measurement start points.

7. The lens shape measuring apparatus according to claim 6, wherein the calculation control circuit divides the lens shape into a first region and a second region, the first region being a region within which the radii ρi do not exceed a maximum moving amount Smax of the feeler in the radial direction in a measurement of the lens shape with the rotation axis line of the feeler positioned at an initial measurement position, the second region being a region within which the radii ρi exceed the maximum moving amount Smax of the feeler in the measurement of the lens shape with the rotation axis line of the feeler positioned at the initial measurement position, in the first region, the calculation control circuit measures the radii ρi with the rotation axis line positioned at a first position, which is the initial measurement position, and in the second region, the calculation control circuit moves the rotation axis line from the initial measurement position to a second position, with which the feeler does not exceed the maximum moving amount Smax, and measures the radii ρi of the lens shape.

8. The lens shape measuring apparatus according to claim 7, wherein in the first region, the calculation control circuit measures angles θi from a measurement start position of the lens shape and the radii ρi of the lens shape for the angles θi, and in the second region, the calculation control circuit measures only the radii ρi of the lens shape.

\* \* \* \* \*